United States Patent
El Essaili et al.

(10) Patent No.: US 12,328,641 B2
(45) Date of Patent: Jun. 10, 2025

(54) METHODS OF IDENTIFYING VAE SERVERS AND RELATED V2X WIRELESS DEVICES AND SERVERS

(71) Applicant: Telefonaktiebolaget LM Ericsson (publ), Stockholm (SE)

(72) Inventors: Ali El Essaili, Aachen (DE); Yunpeng Zang, Würselen (DE); Thorsten Lohmar, Aachen (DE); Maciej Muehleisen, Eynatten (BE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 592 days.

(21) Appl. No.: 17/598,457

(22) PCT Filed: Mar. 12, 2020

(86) PCT No.: PCT/EP2020/056647
§ 371 (c)(1),
(2) Date: Sep. 27, 2021

(87) PCT Pub. No.: WO2020/200686
PCT Pub. Date: Oct. 8, 2020

(65) Prior Publication Data
US 2022/0191649 A1  Jun. 16, 2022

Related U.S. Application Data

(60) Provisional application No. 62/826,210, filed on Mar. 29, 2019.

(51) Int. Cl.
*H04W 4/029* (2018.01)
*H04W 4/40* (2018.01)

(52) U.S. Cl.
CPC ............ *H04W 4/029* (2018.02); *H04W 4/40* (2018.02)

(58) Field of Classification Search
CPC ......... H04W 4/029; H04W 4/40; H04W 4/44; H04W 4/021; H04W 4/50; H04W 76/11;
(Continued)

(56) References Cited

U.S. PATENT DOCUMENTS

| | | |
|---|---|---|
| 2004/0116120 A1 | 6/2004 | Gallagher et al. |
| 2005/0271008 A1* | 12/2005 | Gallagher ............ H04W 28/18 370/341 |

(Continued)

FOREIGN PATENT DOCUMENTS

| | | |
|---|---|---|
| DE | 102017200180 A1 | 7/2018 |
| WO | 2017171806 A1 | 10/2017 |
| WO | 2017173072 A1 | 10/2017 |

OTHER PUBLICATIONS

3rd Generation Partnership Project; Technical Specification Group Services and System Aspects; Application layer support for V2X services; Functional architecture and information flow; (Release 16), 3GPP TS 23.286 v1.0.0 (Mar. 14, 2019), XP051722770 (Year: 2019).*

(Continued)

*Primary Examiner* — Alison Slater
*Assistant Examiner* — Jing Gao
(74) *Attorney, Agent, or Firm* — Sage Patent Group

(57) ABSTRACT

Methods of operating a first VAE server are disclosed. V2X message information per geographical area is received from a V2X application specific server. Position information is received from a VAE client of a wireless device, wherein the position information indicates a position of the wireless device. Responsive to receiving the position information and responsive to the V2X message information per geographical area, a second VAE server is identified based on the position information. An address for the second VAE server is transmitted to the VAE client of the wireless device.

(Continued)

Related VAE servers and V2X wireless devices are also discussed.

22 Claims, 25 Drawing Sheets

(58) Field of Classification Search
CPC ....... H04W 8/005; H04W 4/02; H04W 4/027; H04W 4/48; H04W 48/18; H04W 4/023; H04W 64/00; H04W 4/025; H04W 4/46; H04W 4/024; H04W 12/63; H04W 12/64; H04W 40/20; H04W 36/08; H04W 48/10; H04W 8/245; H04W 76/40; H04W 28/0226; H04W 36/18; H04W 36/00; H04W 36/0016; H04W 72/27; H04W 36/34; H04W 36/12; H04W 36/24; H04W 8/265; H04W 92/045; H04W 52/285; H04W 40/36; H04W 36/362; H04W 28/0861; H04W 36/037; H04L 67/51; H04L 67/52; H04L 61/4511; H04L 67/55; H04L 51/222; H04L 2209/84; H04L 2101/69; H04L 12/2818; H04L 61/5084
See application file for complete search history.

(56) References Cited

U.S. PATENT DOCUMENTS

| | | | |
|---|---|---|---|
| 2016/0316446 A1* | 10/2016 | Rembarz | H04W 4/44 |
| 2016/0323846 A1* | 11/2016 | Park | H04L 12/185 |
| 2021/0208946 A1* | 7/2021 | Watfa | G06F 9/5044 |

OTHER PUBLICATIONS

International Search Report and Written Opinion of the International Searching Authority, PCT/EP2020/056647, mailed May 18, 2020, 18 pages.

$3^{rd}$ Generation Partnership Project; Technical Specification Group Services and System Aspects; Study on Application Layer Support for V2X Services (Release 16) 3GPP TR 23.795 V16.1.0 (Dec. 2018) 77 pages.

3rd Generation Partnership Project; Technical Specification Group Services and System Aspects; Architecture Enhancements for V2X Services (Release 16) 3GPP TS 23.285 V16.0.0 (Mar. 2019) 37 pages.

3rd Generation Partnership Project; Technical Specification Group Services and System Aspects; Application Layer Support for V2X Services (Release 16) 3GPP TS 23.286 V1.0.0 (Mar. 2019) XP051722770, 51 pages.

Chinese Office Action, Chinese Application No. 202210854747.8, mailed Nov. 22, 2024, 6 pages.

Ericsson, "Solution proposal for key issue #18 resolving UE address for ETSI ITS facility layer messages", 3GPP TR 23.795 v1.0, S6-181233, Jul. 23-27, 2018, Sophia-Antipolis, France, 3 pages.

Ericsson, "Procedures for ITS message distribution", 3GPP TS 23.286 v0.0, S6-181555, 3GPP TS 23.286 v0.0, Oct. 15-19, 2018, Vilnius, Lithuania, 6 pages.

Ericsson, "Presentation of TS 23.286 v1.0.0 for information: Application layer support for V2X services", TSG SA WG6, 3GPP TSG-SA Meeting #83 SP-190062, Mar. 20-22, 2019, Shenzhen, China, 1 page.

* cited by examiner

Figure 8

| Information element | Status | Description |
|---|---|---|
| GEO ID | M | Geographical area identifier (e.g. subscription URI, tile identifier, geo-fence tile identifier) |

Figure 9

| Information element | Status | Description |
|---|---|---|
| VAE server ID | M | Identifier of the VAE server (e.g., FQDN) |

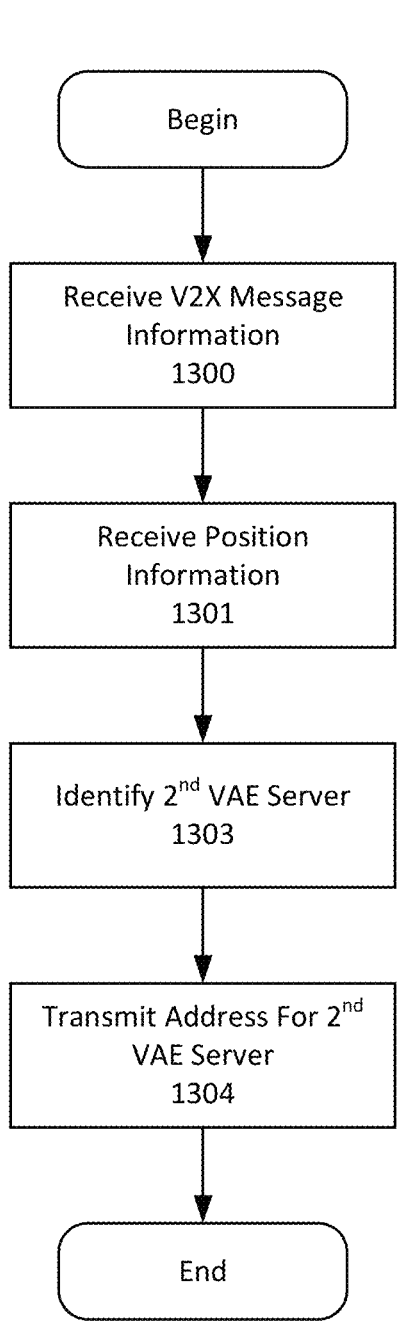
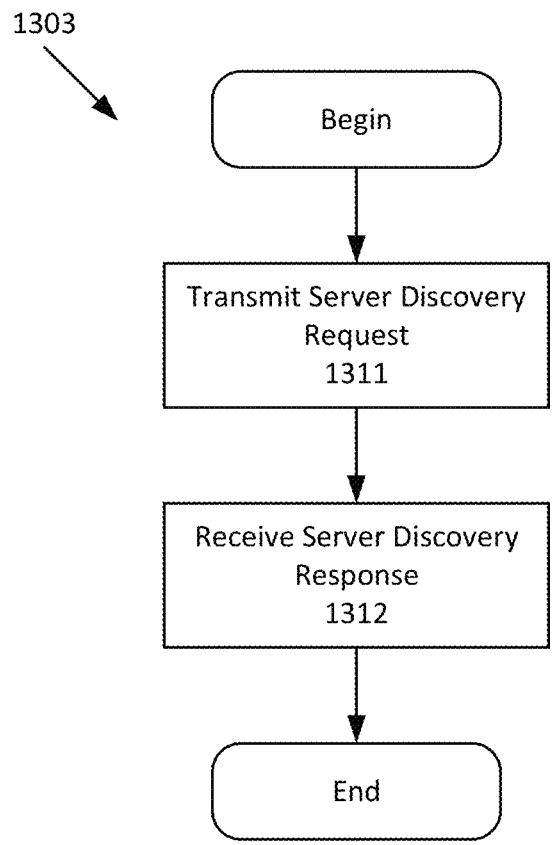
Figure 13A
Figure 13B

| Information element | Status | Description |
|---|---|---|
| GEO ID | M | Geographical area identifier (e.g. subscription URI, tile identifier, geo-fence tile identifier) |

| Information element | Status | Description |
|---|---|---|
| VAE server ID | M | Identifier of the VAE server (e.g., FQDN) |

METHODS OF IDENTIFYING VAE SERVERS AND RELATED V2X WIRELESS DEVICES AND SERVERS

CROSS REFERENCE TO RELATED APPLICATIONS

This application is a 35 U.S.C. § 371 national stage application of PCT International Application No. PCT/EP2020/056647 filed on Mar. 12, 2020, which in turn claims domestic priority to U.S. Provisional Patent Application No. 62/826,210, filed on Mar. 29, 2019, the disclosures and content of which are incorporated by reference herein in their entirety.

TECHNICAL FIELD

The present disclosure relates generally to communications, and more particularly to communication methods and related devices and nodes supporting V2X wireless communications.

BACKGROUND

Server discovery in ITS/V2X message distribution is discussed in the present disclosure. A V2X wireless device UE may need to discover a V2X Application Server (AS) to register to receive specific ITS/V2X messages. Server discovery refers to mechanisms by which the wireless device UE discovers which servers are available and how to connect to a server. A full qualified domain name (FQDN) is often provided to a V2X wireless device UE, and the FQDN is then used to connect to an Application Server AS.

3GPP SA6 TR 23.795 (also referred to as reference [1]) and 3GPP SA6 TS 23.286 (also referred to as reference [3]) define a V2X application enabler (VAE) function at the V2X AS and V2X UE. The VAE is middleware which may relieve the application from several functions (e.g. location management, configuration management) and/or which may provide an interface to the network.

FIG. 1A illustrates a simplified architectural model for the V2X application layer as set forth in reference [1] (see, FIG. 7.1.1.2-1 of reference [1]). It utilizes the architectural reference model specified in subclause 4.2 in 3GPP TS 23.285 (also referred to as reference [2]) which may have impact on the application layer support aspects. FIG. 1A illustrates a simplified architectural model for the V2X application layer corresponding to FIG. 7.1.1.2-1 of reference [1], and FIG. 1B illustrates a V2X application layer functional model corresponding to FIGS. 6.2-2 of 3GPP TS 23.286 (also referred to as reference [3]).

The V2X wireless device UE1 communicates with V2X application server over a V1 reference point. The V2X wireless device UE1 and V2X wireless device UE2 communicate over V5 reference point. V2X UE1 can also act as a UE-to-network-relay, to enable V2X wireless device UE2 to access the V2X application server over the V1 reference point.

The reference point V1 supports the V2X application related interactions between V2X wireless device UE and V2X Application Server AS and is specified in 3GPP TS 23.285 (reference [2]). This reference point is supported for both unicast and multicast delivery modes. The reference point V5 supports the interactions between the V2X wireless devices UEs and is specified in 3GPP TS 23.285 (reference [2]).

FIG. 2 (corresponding to FIG. 7.1.1.2-2 of reference [1]) illustrates a detailed V2X application layer functional model defined in TR 23.795 (reference [1]). It enhances the simplified architectural model for the V2X application layer by specifying the functional entities at the V2X application layer. FIG. 2 illustrates a V2X application layer functional model corresponding to FIG. 7.1.1.2-2 of reference [1].

The V2X application server may include a V2X application enabler (VAE) server and a V2X application specific server. The VAE server provides the V2X application layer support functions to the V2X application specific server over a Vs reference point.

The V2X wireless devices UEs may include the VAE client and the V2X application specific client. The VAE client provides the V2X application layer support functions to the V2X application specific client over a Vc reference point.

The VAE client communicates with the VAE server over V1-AE reference point. The V2X application specific client communicates with V2X application specific server over V1-APP reference point.

The VAE client of V2X wireless device UE2 communicates with a VAE client of V2X wireless device UE1 over V5-AE reference point. The V2X application specific client of V2X wireless device UE2 communicates with VAE client of V2X wireless device UE1 over V5-APP reference point.

In distributed deployments, VAE servers communicate over the VAE-E reference point.

As discussed above, a V2X wireless device UE may discover a V2X Application Server (AS) to register to receive specific ITS/V2X messages. A V2X Application Server (AS), however, may be associated with a geographic area/region. Accordingly, a V2X wireless device UE may register with a V2X AS associated with a geographic area/region, but the V2X wireless device UE may move outside the geographic area/region associated with the V2X AS to which it is registered.

SUMMARY

According to some embodiments of inventive concepts, a method is provided to operate a first vehicle-to-anything V2X application enabler VAE server. V2X message information per geographical area is received from a V2X application specific server. Position information is received from a VAE client of a wireless device, wherein the position information indicates a position of the wireless device. Responsive to receiving the position information and responsive to the V2X message information per geographical area, a second VAE server is identified based on the position information. An address for the second VAE server is transmitted to the VAE client of the wireless device.

According to some other embodiments of inventive concepts, a method is provided to operate a first vehicle-to-anything V2X application enabler VAE server. A server discovery request is received from a second VAE server, wherein the server discovery request includes position information for a wireless device. A server discovery response is transmitted to the second VAE server in response to the server discovery request, wherein the server discovery response includes the address of the first VAE server.

According to still other embodiments of inventive concepts, a method is provided to operate a vehicle-to-anything (V2X) wireless device. VAE server information is provided for a plurality of VAE servers, wherein the VAE server information includes for each of the plurality of VAE servers a respective address, a respective geographic area associated with the VAE server, and/or respective service/message information regarding V2X services available from the VAE server. The V2X wireless device subscribes to receive V2X messages from a first VAE server (01) of the plurality of VAE servers. Responsive to detecting movement from a first geographic area associated with the first VAE server to a second geographic area, a second VAE server of the plurality of VAE servers associated with the second geographic area is identified based on the VAE server information. Responsive to identifying the second VAE server, the V2X wireless device subscribes to receive V2X messages from the second VAE server.

According to other embodiments of inventive concepts, a first vehicle-to-anything V2X application enabler VAE server is configured to operate with a communication network. The VAE server includes processing circuitry and memory coupled with the processing circuitry. The memory includes instructions that when executed by the processing circuitry causes the first VAE server to: receive V2X message information per geographical area from a V2X application specific server; receive position information from a VAE client of a wireless device, wherein the position information indicates a position of the wireless device; identify a second VAE server (02) based on the position information responsive to receiving the position information and responsive to the V2X message information per geographical area; and transmit an address for the second VAE server (02) to the VAE client of the wireless device.

According to other embodiments of inventive concepts, a first vehicle-to-anything V2X application enabler VAE server is configured to operate with a communication network. The VAE server is adapted to: receive V2X message information per geographical area from a V2X application specific server; receive position information from a VAE client of a wireless device, wherein the position information indicates a position of the wireless device; identify a second VAE server (02) based on the position information responsive to receiving the position information and responsive to the V2X message information per geographical area; and transmit an address for the second VAE server (02) to the VAE client of the wireless device.

According to other embodiments of inventive concepts, a first vehicle-to-anything V2X application enabler VAE server is configured to operate with a communication network. The VAE server includes processing circuitry and memory coupled with the processing circuitry. The memory includes instructions that when executed by the processing circuitry causes the first VAE server to: receive a server discovery request from a second VAE server (01), wherein the server discovery request includes position information for a wireless device; and transmit a server discovery response to the second VAE server in response to the server discovery request, wherein the server discovery response includes the address of the first VAE server.

According to other embodiments of inventive concepts, a first vehicle-to-anything V2X application enabler VAE server is configured to operate with a communication network. The first VAE server is adapted to: receive a server discovery request from a second VAE server (01), wherein the server discovery request includes position information for a wireless device; and transmit a server discovery response to the second VAE server in response to the server discovery request, wherein the server discovery response includes the address of the first VAE server.

According to other embodiments of inventive concepts, a computer program includes program code to be executed by processing circuitry of a first VAE server configured to operate with a communication network. Execution of the program code causes the first VAE server to: receive V2X message information per geographical area from a V2X application specific server; receive position information from a VAE client of a wireless device, wherein the position information indicates a position of the wireless device; responsive to receiving the position information and responsive to the V2X message information per geographical area, identify a second VAE server based on the position information; and transmit an address for the second VAE server to the VAE client of the wireless device.

According to other embodiments of inventive concepts, a computer program product includes a non-transitory storage medium including program code to be executed by processing circuitry of a first VAE server configured to operate in a communication network. Execution of the program code causes the first VAE server to: receive V2X message information per geographical area from a V2X application specific server; receive position information from a VAE client of a wireless device, wherein the position information indicates a position of the wireless device; responsive to receiving the position information and responsive to the V2X message information per geographical area, identify a second VAE server (02) based on the position information; and transmit an address for the second VAE server (02) to the VAE client of the wireless device.

According to other embodiments of inventive concepts, a computer program includes program code to be executed by processing circuitry of a first VAE server configured to operate with a communication network. Execution of the program code causes the first VAE server to: receive a server discovery request from a second VAE server (01), wherein the server discovery request includes position information for a wireless device; and transmit a server discovery response to the second VAE server in response to the server discovery request, wherein the server discovery response includes the address of the first VAE server.

According to other embodiments of inventive concepts, a computer program product includes a non-transitory storage medium including program code to be executed by processing circuitry of a first VAE server configured to operate in a communication network. Execution of the program code causes the first VAE server to: receive a server discovery request from a second VAE server (01), wherein the server discovery request includes position information for a wireless device; and transmit a server discovery response to the second VAE server in response to the server discovery request, wherein the server discovery response includes the address of the first VAE server.

According to other embodiments of inventive concepts, a vehicle-to-anything V2X wireless device is configured to operate in a communication network. The V2X wireless device includes processing circuitry and memory coupled with the processing circuitry. The memory includes instructions that when executed by the processing circuitry causes the V2X wireless device to: provide VAE server information for a plurality of VAE servers, wherein the VAE server information includes for each of the plurality of VAE servers a respective address, a respective geographic area associated with the VAE server, and/or respective service/message information regarding V2X services available from the VAE server; subscribe to receive V2X messages from a first VAE server (01) of the plurality of VAE servers; identify a second VAE server (02) of the plurality of VAE servers associated with the second geographic area based on the VAE server information responsive to detecting movement from a first geographic area associated with the first VAE server to a second geographic area; and subscribe to receive V2X messages from the second VAE server responsive to identifying the second VAE server.

According to other embodiments of inventive concepts, a vehicle-to-anything V2X wireless device is configured to operate in a communication network. The V2X wireless device is adapted to: provide VAE server information for a plurality of VAE servers, wherein the VAE server information includes for each of the plurality of VAE servers a respective address, a respective geographic area associated with the VAE server, and/or respective service/message information regarding V2X services available from the VAE server; subscribe to receive V2X messages from a first VAE server (01) of the plurality of VAE servers; identify a second VAE server (02) of the plurality of VAE servers associated with the second geographic area based on the VAE server information responsive to detecting movement from a first geographic area associated with the first VAE server to a second geographic area; and subscribe to receive V2X messages from the second VAE server responsive to identifying the second VAE server.

According to other embodiments of inventive concepts, a computer program includes program code to be executed by processing circuitry of a V2X wireless device configured to operate in a communication network. Execution of the program code causes the V2X wireless device to: provide VAE server information for a plurality of VAE servers, wherein the VAE server information includes for each of the plurality of VAE servers a respective address, a respective geographic area associated with the VAE server, and/or respective service/message information regarding V2X services available from the VAE server; subscribe to receive V2X messages from a first VAE server (01) of the plurality of VAE servers; responsive to detecting movement from a first geographic area associated with the first VAE server to a second geographic area, identify a second VAE server (02) of the plurality of VAE servers associated with the second geographic area based on the VAE server information; and responsive to identifying the second VAE server, subscribe to receive V2X messages from the second VAE server.

According to other embodiments of inventive concepts, a computer program product includes a non-transitory storage medium including program code to be executed by processing circuitry of a V2X wireless device configured to operate in a communication network. Execution of the program code causes the V2X wireless device to: provide VAE server information for a plurality of VAE servers, wherein the VAE server information includes for each of the plurality of VAE servers a respective address, a respective geographic area associated with the VAE server, and/or respective service/message information regarding V2X services available from the VAE server; subscribe to receive V2X messages from a first VAE server (01) of the plurality of VAE servers; responsive to detecting movement from a first geographic area associated with the first VAE server to a second geographic area, identify a second VAE server (02) of the plurality of VAE servers associated with the second geographic area based on the VAE server information; and responsive to identifying the second VAE server, subscribe to receive V2X messages from the second VAE server.

According to some embodiments of inventive concepts, support may be provided for a V2X wireless device moving between different geographic areas serviced by different VAE servers.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 8 is a table illustrating a server discovery request according to some embodiments of inventive concepts;

FIG. 9 is a table illustrating a server discovery response according to some embodiments of inventive concepts;

FIGS. 13A and 13B are a flow charts illustrating operations of a VAE server (VAE Server 01) according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 10:
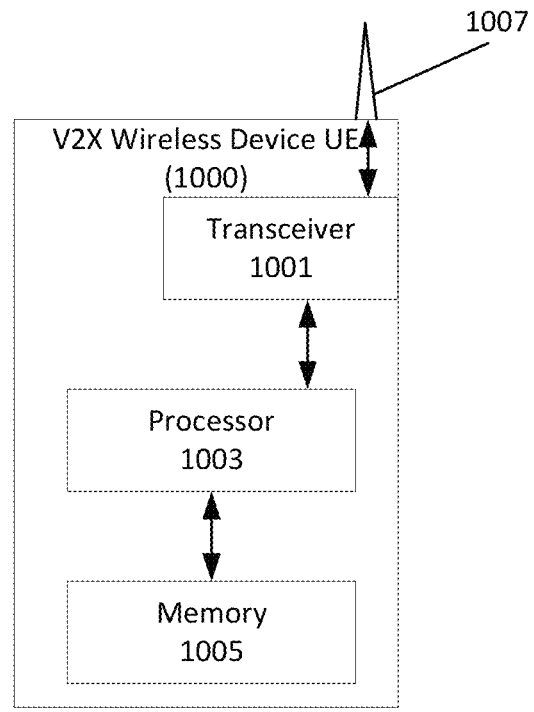
FIG. 10 is a block diagram illustrating a V2X wireless device UE according to some embodiments of inventive concepts.

FIG. 10 is a block diagram illustrating elements of a V2X wireless device UE 1000 (also referred to as a V2X mobile terminal, a V2X mobile communication terminal, a V2X wireless communication device, a V2X wireless terminal, V2X mobile device, a V2X wireless communication terminal, V2X user equipment, V2X UE, a V2X user equipment node/terminal/device, etc.) configured to provide wireless communication according to embodiments of inventive concepts. (V2X wireless device UE 1000 may be provided, for example, as discussed below with respect to wireless device QQ110 of FIG. 16.) As shown, V2X wireless device UE may include an antenna 1007 (e.g., corresponding to antenna QQ111 of FIG. 16), and transceiver circuitry 1001 (also referred to as a transceiver, e.g., corresponding to interface QQ114 of FIG. 16) including a transmitter and a receiver configured to provide uplink and downlink radio communications with a base station(s) (e.g., corresponding to network node QQ160 of FIG. 16, also referred to as a RAN node) of a radio access network. V2X wireless device UE may also include processing circuitry 1003 (also referred to as a processor, e.g., corresponding to processing circuitry QQ120 of FIG. 16) coupled to the transceiver circuitry, and memory circuitry 1005 (also referred to as memory, e.g., corresponding to device readable medium QQ130 of FIG. 16) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that separate memory circuitry is not required. V2X Wireless device UE may also include an interface (such as a user interface) coupled with processing circuitry 1003, and/or V2X wireless device UE may be incorporated in a vehicle.

As discussed herein, operations of V2X wireless device UE may be performed by processing circuitry 1003 and/or transceiver circuitry 1001. For example, processing circuitry 1003 may control transceiver circuitry 1001 to transmit communications through transceiver circuitry 1001 over a radio interface to a radio access network node (also referred to as a base station) and/or to receive communications through transceiver circuitry 1001 from a RAN node over a radio interface. Processing circuitry 1003 may also control transceiver circuitry 1001 to transmit communications through transceiver circuitry 1001 over a radio interface directly to another/other V2X wireless device/devices UE/UEs (without passing the radio access network) and/or to receive communications through transceiver circuitry 1001 directly from another/other V2X wireless device/devices UE/UEs (without passing the radio access network). Moreover, modules may be stored in memory circuitry 1005, and these modules may provide instructions so that when instructions of a module are executed by processing circuitry 1003, processing circuitry 1003 performs respective operations (e.g., operations discussed below with respect to Example Embodiments relating to V2X wireless devices).

Figure 11:
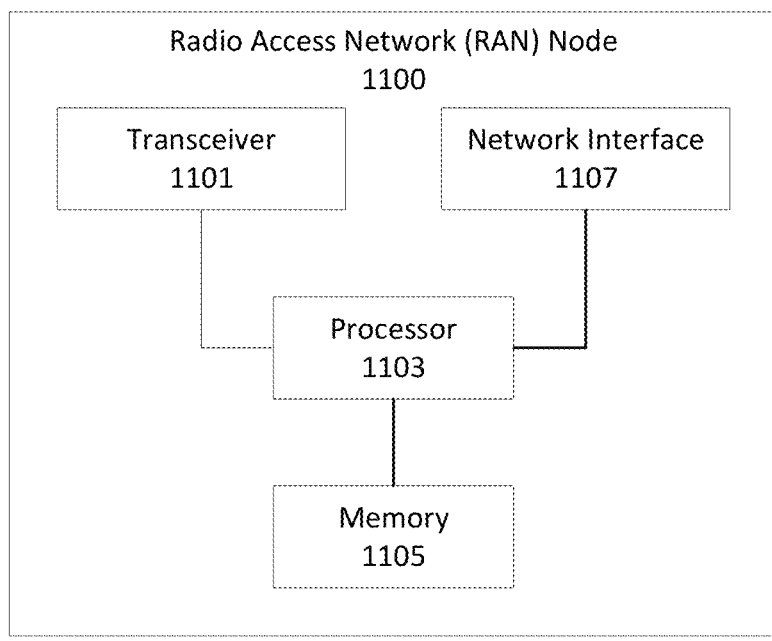
FIG. 11 is a block diagram illustrating a radio access network RAN node (e.g., a base station eNB/gNB) according to some embodiments of inventive concepts.

FIG. 11 is a block diagram illustrating elements of a radio access network RAN node 1100 (also referred to as a network node, base station, eNodeB/eNB, gNodeB/gNB, etc.) of a Radio Access Network (RAN) configured to provide cellular communication according to embodiments of inventive concepts. (RAN node 1100 may be provided, for example, as discussed below with respect to network node QQ160 of FIG. 16.) As shown, the RAN node may include transceiver circuitry 1101 (also referred to as a transceiver, e.g., corresponding to portions of interface QQ190 of FIG. 16) including a transmitter and a receiver configured to provide uplink and downlink radio communications with mobile terminals. The RAN node may include network interface circuitry 1107 (also referred to as a network interface, e.g., corresponding to portions of interface QQ190 of FIG. 16) configured to provide communications with other nodes (e.g., with other base stations) of the RAN and/or core network CN. The network node may also include processing circuitry 1103 (also referred to as a processor, e.g., corresponding to processing circuitry QQ170) coupled to the transceiver circuitry, and memory circuitry 1105 (also referred to as memory, e.g., corresponding to device readable medium QQ180 of FIG. 16) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that a separate memory circuitry is not required.

As discussed herein, operations of the RAN node may be performed by processing circuitry 1103, network interface 1107, and/or transceiver 1101. For example, processing circuitry 1103 may control transceiver 1101 to transmit downlink communications through transceiver 1101 over a radio interface to one or more V2X wireless devices UEs and/or to receive uplink communications through transceiver 1101 from one or more V2X wireless devices UEs over a radio interface. Similarly, processing circuitry 1103 may control network interface 1107 to transmit communications through network interface 1107 to one or more other network nodes and/or to receive communications through network interface from one or more other network nodes. Accordingly, RAN node 1100 may relay communications between V2X wireless devices UEs and VAE servers. Moreover, modules may be stored in memory 1105, and these modules may provide instructions so that when instructions of a module are executed by processing circuitry 1103, processing circuitry 1103 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 12:
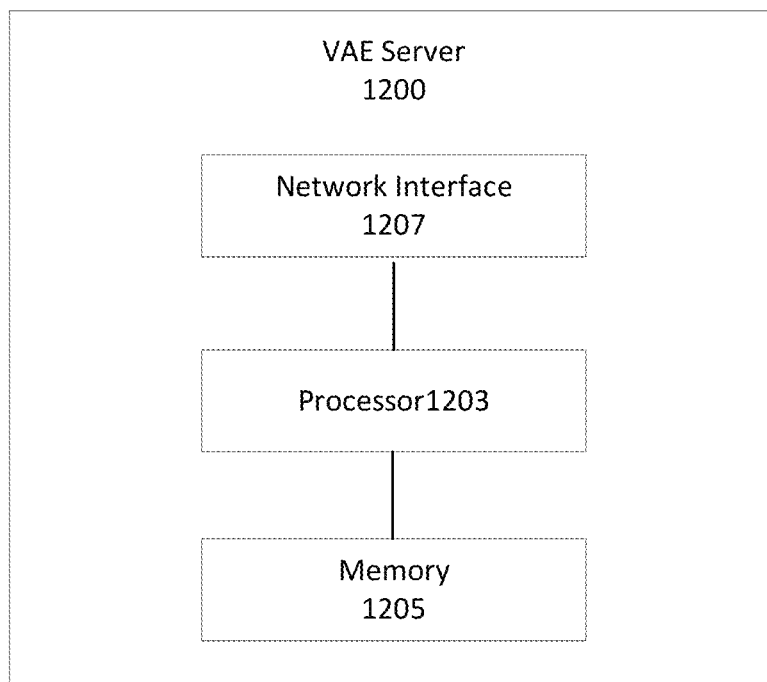
FIG. 12 is a block diagram illustrating a VAE server according to some embodiments of inventive concepts.

FIG. 12 is a block diagram illustrating elements of a VAE server 1200 according to embodiments of inventive concepts. As shown, the VAE server may include network interface circuitry 1207 (also referred to as a network interface) configured to provide communications with other nodes of a core network and/or a radio access network RAN. The VAE server may also include processing circuitry 1203 (also referred to as a processor) coupled to the network interface circuitry, and memory circuitry 1205 (also referred to as memory) coupled to the processing circuitry. The memory circuitry 1205 may include computer readable program code that when executed by the processing circuitry 1203 causes the processing circuitry to perform operations according to embodiments disclosed herein. According to other embodiments, processing circuitry 1203 may be defined to include memory so that a separate memory circuitry is not required.

As discussed herein, operations of the VAE server may be performed by processing circuitry 1203 and/or network interface circuitry 1207. For example, processing circuitry 1203 may control network interface circuitry 1207 to transmit communications through network interface circuitry 1207 to one or more other network nodes and/or V2X wireless devices UEs and/or to receive communications through network interface circuitry from one or more other network nodes and/or V2X wireless devises UEs. Moreover, modules may be stored in memory 1205, and these modules may provide instructions so that when instructions of a module are executed by processing circuitry 1203, processing circuitry 1203 performs respective operations (e.g., operations discussed below with respect to Example Embodiments relating to VAE servers).

TS 23.286 (also referred to as reference [3]) describes procedures used to register and receive V2X messages and to subscribe to geographical location by the VAE client of a V2X wireless device UE. The VAE server discovery (i.e., determining the right VAE server to serve the VAE client) may, however, be unspecified.

When a V2X wireless device UE moves to a new geographical area, the best VAE server to serve the V2X wireless device UE might change depending on several factors, such as location and V2X messages supported by the VAE server. As a result, a server discovery procedure may be useful/required to determine the best VAE server for the V2X wireless device UE.

Depending on deployment, there might be multiple VAE servers where each VAE server can serve Intelligent Transport System ITS messages to a certain geographic region or area (e.g., corresponding to a tile or geo-fence). When the V2X wireless device UE enters a new geographical area (e.g., when it crosses a border), it may have to discover the new VAE server responsible for delivering ITS/V2X messages for that target geographical area. Note that the ITS messages may be region-specific, and therefore the V2X wireless device UE may need to start receiving the messages from a new VAE server when moving into a new geographical area.

In current V2X work for application layer support, in TR 23.795 (reference [1]) and TS 23.286 (reference [3]), the V2X wireless device UE updates its location to the VAE server when moving to a new area, but the assumption is that the V2X wireless device UE continues receiving messages from the same VAE server. VAE server discovery may thus not be considered.

Figure 7:
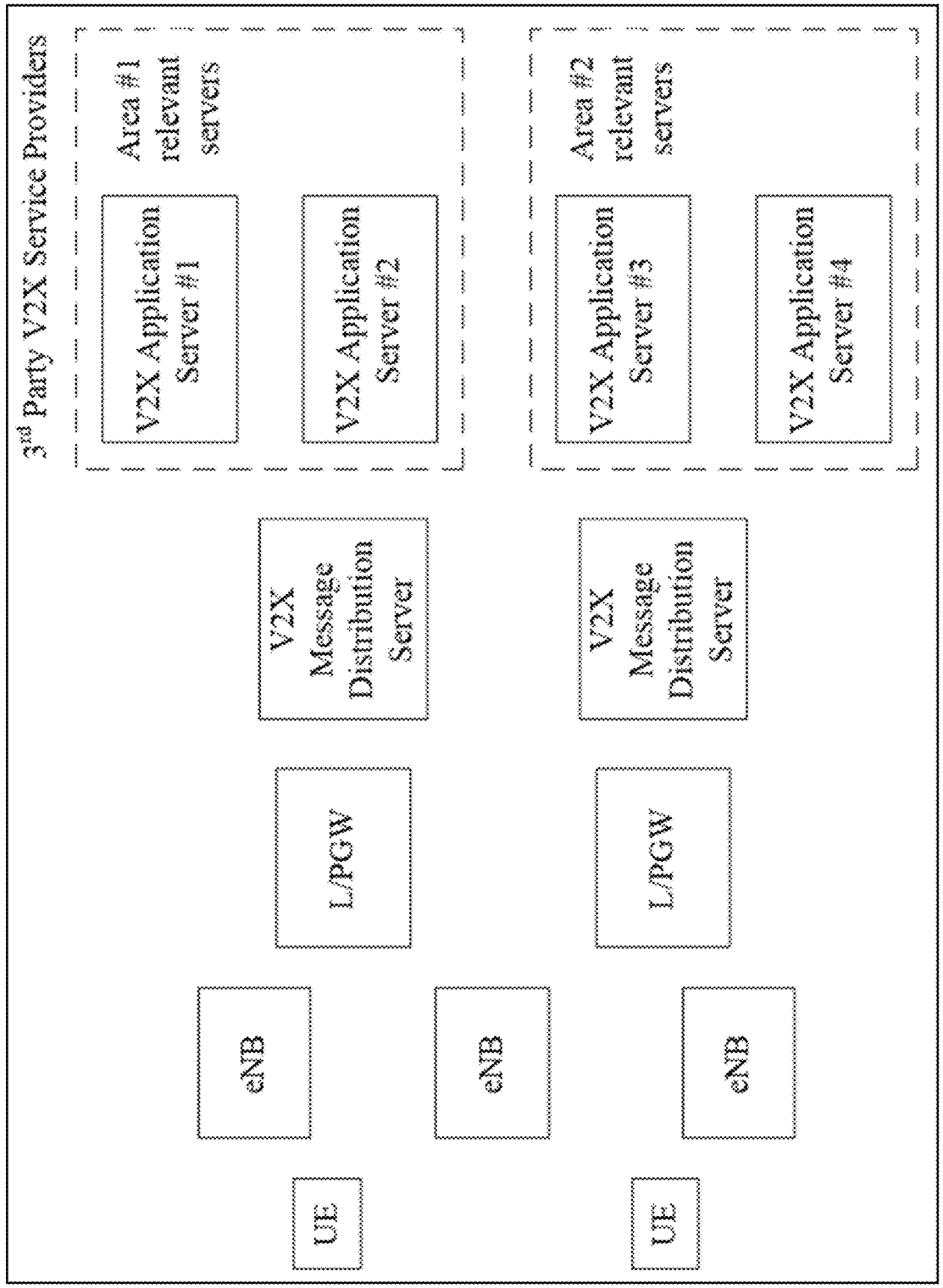
FIG. 7 illustrates portions of Annex D of 3GPP TS 23.285 v15.1.0.

Annex D of 3GPP TS 23.285 v15.1.0 (2018-06) (reference [2]) describes a network-based method to change a V2X application-server, and Figure D.1-1 of Annex D is provided in FIG. 7 illustrating a V2X message distribution server deployment option. As discussed in Annex D of Reference [2]:

In the case of non-session based V2X services (i.e. Road Status Notification), it is possible that a single V2X message needs to be delivered to multiple locally relevant V2X Application Servers. In order to provide network support for the distribution of these V2X messages to multiple V2X Application Servers, a possible deployment option includes a V2X Message Distribution Server behind the L/PGW as illustrated in Figure D.1-1. It is configured to distinguish whether a V2X message needs to be delivered to multiple V2X Application Servers and send them accordingly.

UEs discover and send V2X messages to these network deployed distribution servers in the same way as to V2X Application Servers. From the UE perspective, it is communicating with a V2X Application Server and is not aware whether any of the V2X messages are further distributed onward to other servers.

NOTE: The V2X Message Distribution Server is used for illustrative purpose and not further described in any 3GPP specification.

The following differences are noted with respect to Annex D of Reference [2] relative to some embodiments of inventive concepts:

1) Annex D addresses issues when multiple V2X application servers belong to a same area, and not different areas. When application servers belong to different areas, the publishing group options of ITS messages (which can be geo-area based, two options considered) may be useful/needed. When V2X application servers belong to the same area, this issue may not occur, since all servers serve the same area. In principle, network performance, load based, or other approaches can be used to select one of the servers.

2) In addition, for approaches in Annex D to address issues regarding V2X application servers for different areas, a 3rd part V2X application server may need to provide Publishing group options and information to the V2X message distribution server, which may be undesirable and/or unfeasible.

3) The V2X message distribution server is not part of SA2 (TS 23.285) or SA6 (TR 23.795 and TS 23.286) functional models and it would appear to act as a broker (in case of MQTT/ITS message distribution approaches). Additional information about UE and ITS service may be provided.

4) TS 23.285 Annex D states that this is an open issue, but only provides a high level figure, not any approaches: "for illustrative purpose . . . not further described in any 3GPP specification"

5) According to some embodiments of inventive concepts, a V2X application server may be provided as an alternative to edge cloud approaches or to reduce/avoid edge cloud approaches. "Edge Servers" is actually a deployment term. In principle, it may be more accurate to refer to "application servers, which are deployed at edge sites". 3GPP does not define detailed functions of application servers or edge servers.

6) Impact on a V2X wireless device UE may be reduced, by reducing redirection. VAE server discovery can be transparent to a V2X wireless device UE, when the VAE server forwards V2X wireless device UE messages to a new VAE server. Approaches in Annex D may also have V2X wireless device UE impact, when a V2X wireless device UE moves to a different area.

According to some embodiments of inventive concepts, procedures for VAE server discovery in ITS/V2X message distribution may be provided. Such procedures may allow the V2X wireless device UE to receive ITS/V2X messages from a new VAE server when moving to a new geographical area.

Figure 1A:
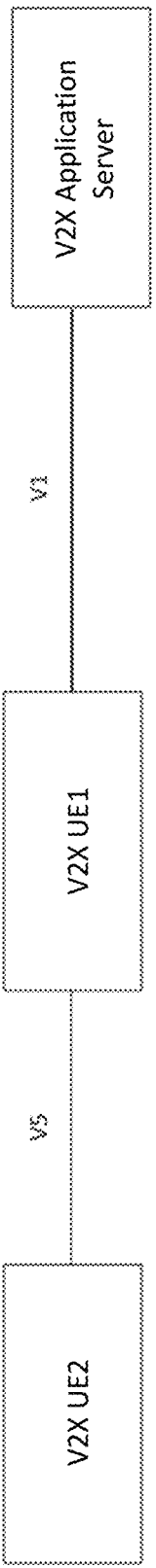
FIG. 1A illustrates an architectural model for a V2X application layer corresponding to FIG. 7.1.1.2-1 of Reference [1]
Figure 1B:
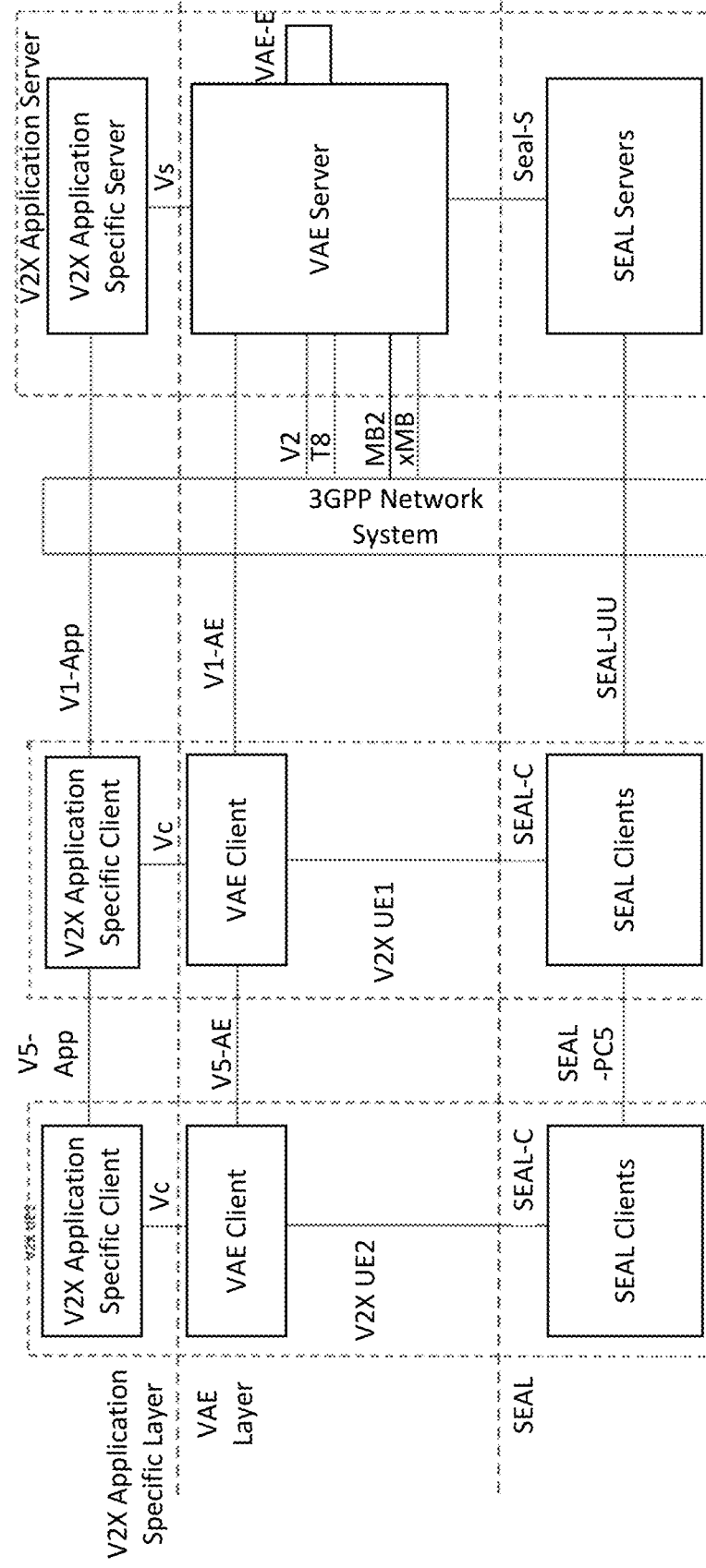
FIG. 1B illustrates a V2X application layer functional model corresponding to FIGS. 6.2-2 of Reference [3]
Figure 2:
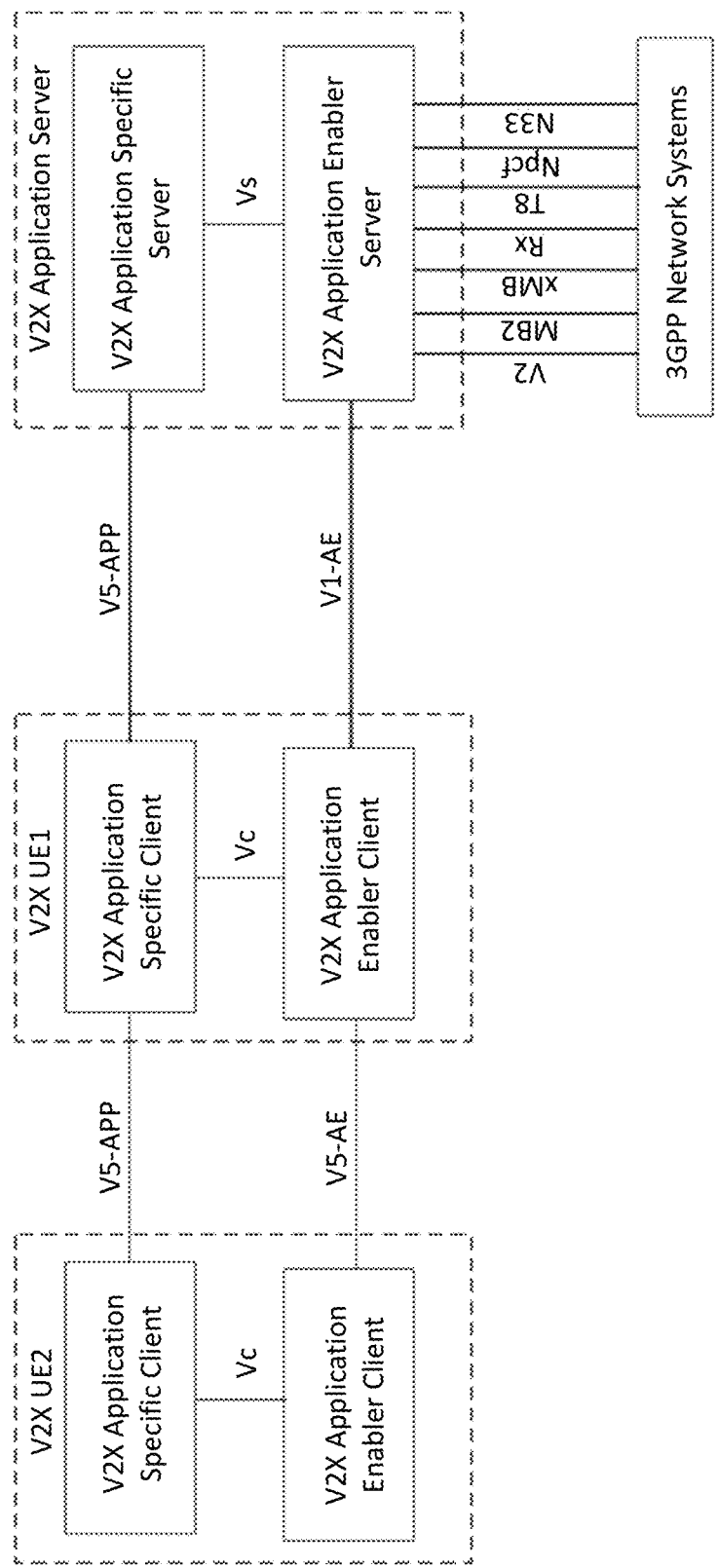
FIG. 2 illustrates a V2X application layer functional model corresponding to FIG. 7.1.1.2-2 of Reference [1]
Figure 3:
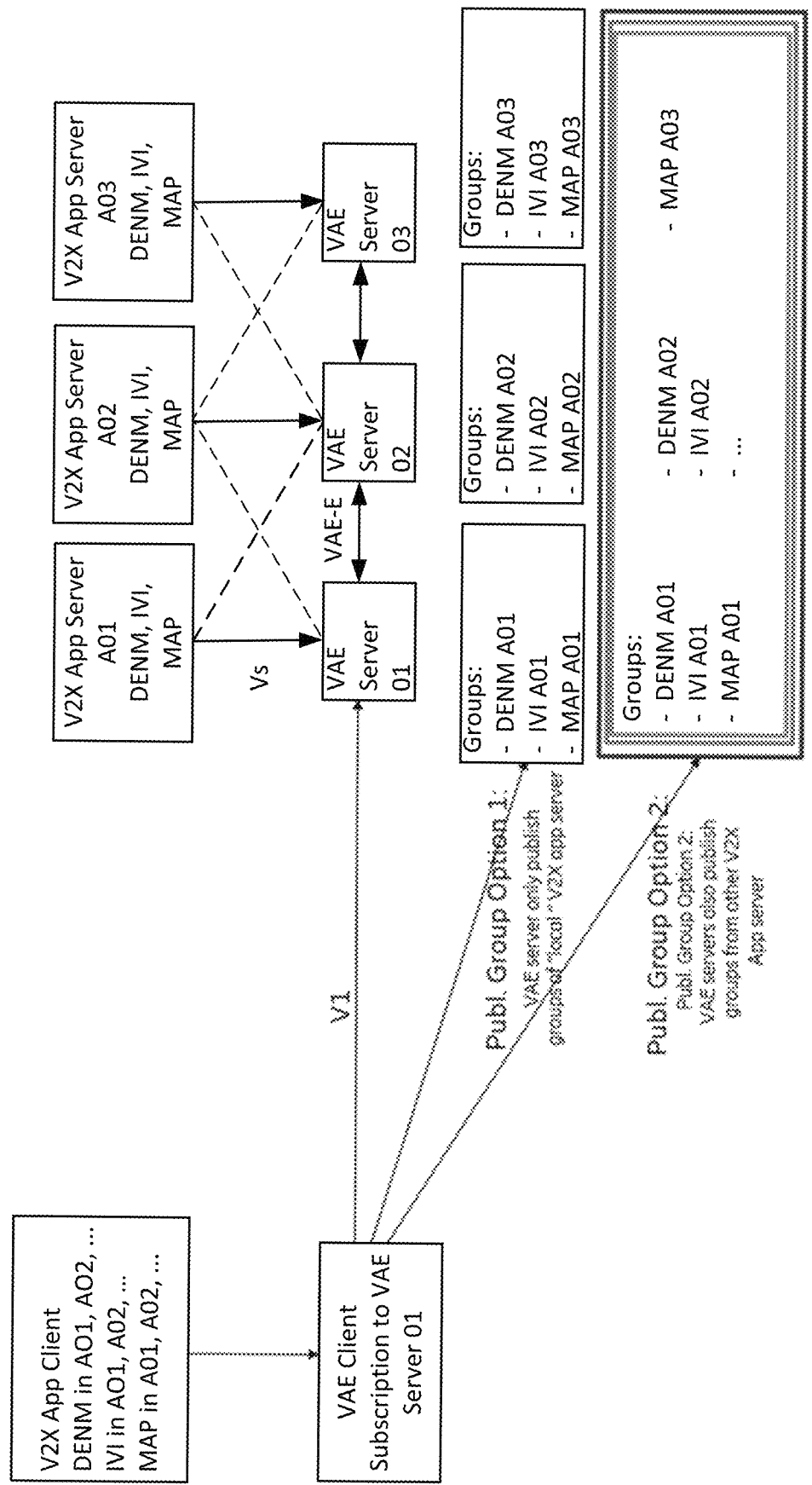
FIG. 3 illustrates VAE clients and servers publishing and server associations with different geographical areas according to some embodiments of inventive concepts.

FIG. 3 illustrates a relation between different V2X/ITS message groups and geographical locations.

A V2X wireless device UE (VAE client) is registered to receive V2X/ITS messages (e.g., DENM, IVI, MAP, and CAM messages). The VAE client (V2X wireless device UE) is in geographic area 1 (A01) and subscribed to VAE Server 01. The VAE client communicates with the VAE server over the V1 reference point, the VAE server communicates with the V2X APP server over Vs reference point, and VAE servers can communicate over a VAE-E reference point (also referred to as a VAE-x reference point).

Two options for publishing V2X/ITS messages at the VAE server are provided according to some embodiments disclosed herein. In option 1, the VAE server publishes message groups associated with its own geographical area only. In this case, it is communicating with a single V2X APP server (solid Vs lines). In option 2, the VAE server publishes message groups which are associated with multiple geographical areas. In this case, it is communicating with multiple V2X APP servers (solid and dotted Vs lines).

FIG. 3 illustrates VAE clients (V2X wireless devices UEs) and servers publishing and association with different geographical areas.

When the VAE client (V2X wireless devices UE) moves to a new geographical area 02 (A02), it continues to receive messages from the VAE Server 01 where no VAE discovery is considered.

According to some embodiments of inventive concepts, the VAE client (V2X wireless device UE) sends a position update to VAE Server 1 when it moves from A01 to A02. This triggers a VAE server discovery procedure upon which the VAE client (V2X wireless device UE) is redirected to VAE Server 02. In publishing option 1, the transition to VAE Server 02 may be useful/necessary because VAE Server 01 may no longer be able to serve the messages for A02. In publishing option 2, the transition to VAE Server 02 may be beneficial if the new VAE server provides better connectivity (e.g. lower latency) to the VAE client (V2X wireless device UE).

Figure 4:
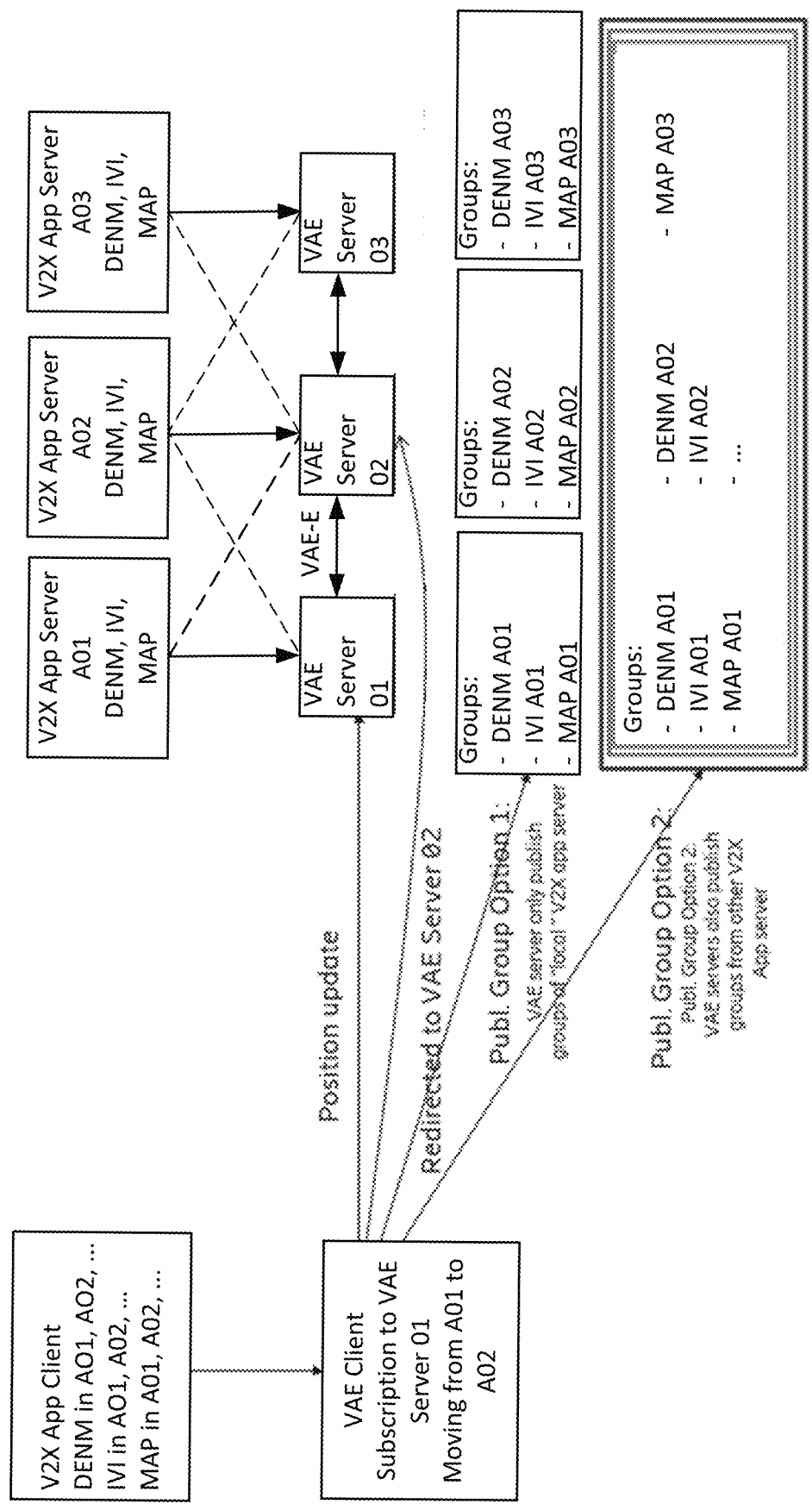
FIG. 4 illustrates VAE client redirected to a VAE server 02 upon moving to AO2 according to some embodiments of inventive concepts.

FIG. 4 illustrates the VAE client (V2X wireless device UE) being redirected to a VAE server 02 upon moving to area A02.

According to some embodiments of inventive concepts, a V2X wireless device UE may be allowed to receive ITS/V2X messages when moving to a new geographical area. These messages may be provided by a new VAE server which can be responsible for providing specific ITS messages targeted to that area (e.g., when V2X wireless device UE crosses a border to a new country) or from a VAE server that provides better connectivity.

According to some embodiments of inventive concepts, no special features in 3GPP RAN (e.g., Selective IP Traffic Offloading SIPTO) may be needed.

Figure 5A:
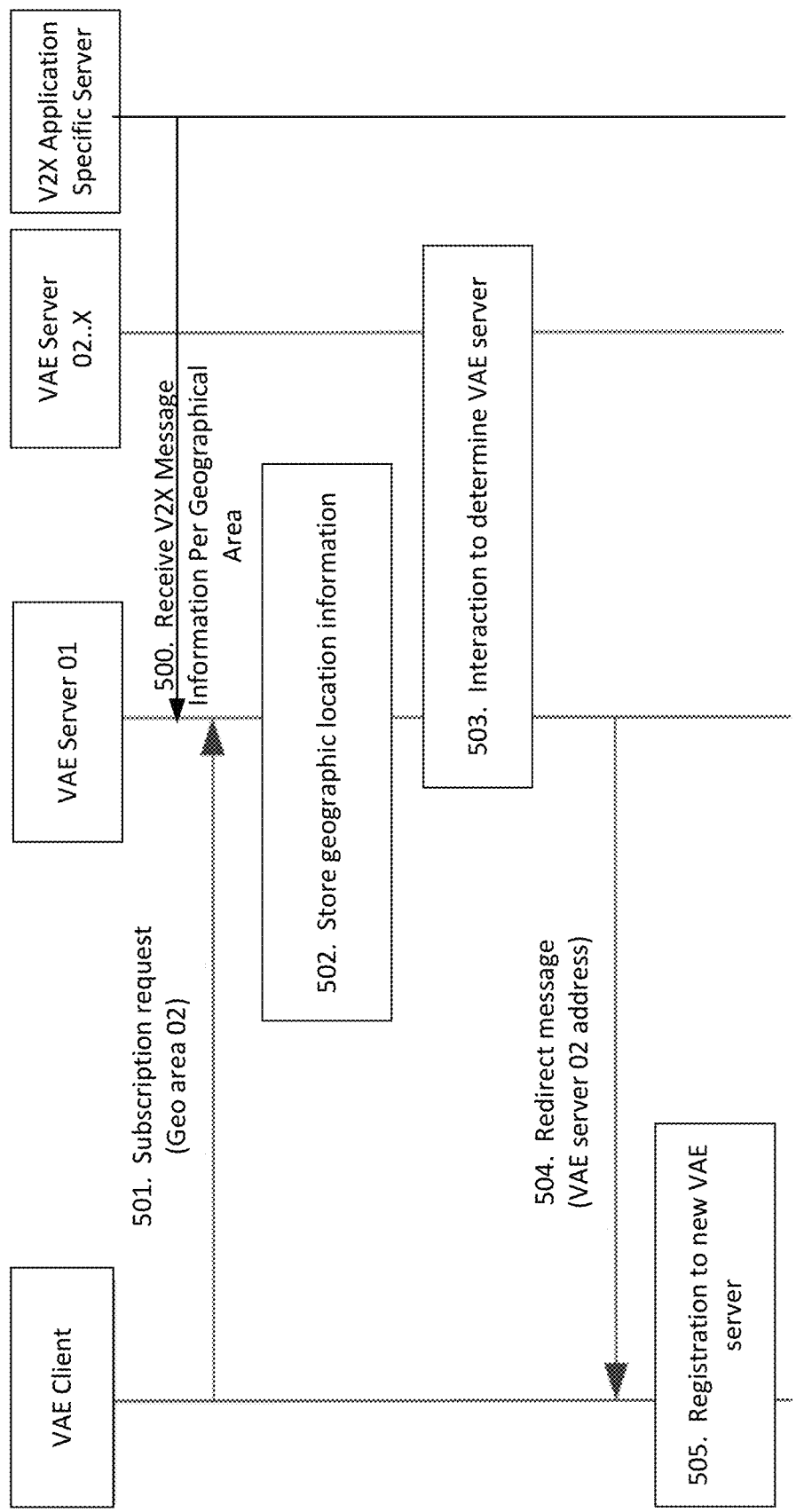
FIG. 5A illustrates VAE server discovery operations upon movement to a new geographical area according to some embodiments of inventive concepts.

FIG. 5A illustrates VAE server discovery upon movement to a new geographical area according to some embodiments of inventive concepts.

According to some embodiments of inventive concepts, a VAE client (V2X wireless device UE) subscription procedure (position update) may be used when moving to a new geographical area to update the VAE client (V2X wireless device UE) about the availability of a new VAE server. Operations according to some embodiments are shown in FIG. 5A, and such operations are discussed below:

501) Responsive to the VAE client (V2X wireless device UE) moving into a new geographical area 02 (from geographical area 01), the VAE client (V2X wireless device UE) provides a geographical area update (also referred to as a position update message) to the VAE server. While the update of operation 501 is shown as a subscription request, the message may generally be provided as a position update message (which may be included in a subscription request message) including information identifying the new geographical area 02.

502) The VAE server stores the new geographic area information 02 associated with the VAE client.

503) The VAE server interacts with other VAE servers over the VAE-E interface to identify/find an appropriate/best VAE server for the VAE client (V2X wireless device UE). The interaction over the VAE-E interface may include providing the new geographical area location information to other VAE servers using a server discovery request message as discussed below with respect to FIG. 5B.

Upon receiving the subscription request (position update message), the VAE server checks if it can continue to serve the messages targeting geographical area 02. In case of publishing option 1, the VAE server 01 may not be able to serve the new messages targeting geographic area 02, and the VAE server should thus trigger the VAE discovery procedure.

In case of publishing option 2, the VAE server may still search for a new VAE server for geographical area 02 that is in closer proximity to the VAE client (V2X wireless device UE). There are at least two possibilities to enable this search. One possibility is that each VAE server knows its own geographical location. The second possibility is that the V2X APP server provides a preferred VAE server for each geographical area.

504) The VAE server sends a redirect message to redirect the VAE client (V2X wireless device UE) to the new VAE server in area 02. The address of the VAE server 02 can be provided in an acknowledgment message that is responsive to the subscription message (position update message) of operation 501.

505) The VAE client (V2X wireless device UE) may establish a connection to the new VAE server based on the address of operation 504. The VAE client (V2X wireless device UE) may register to new ITS/V2X messages if needed, for example, by transmitting a registration message to the new VAE server.

Notes regarding operations of FIG. 5A are provided below:

a. Server discovery approaches according to some embodiments of inventive concepts may also be used for initial registration, i.e., when the VAE client (V2X wireless device UE) first subscribes to a geographic area.

b. The VAE server (or location management server associated or part of the VAE server) can trigger the VAE server discovery procedure.

c. There may be multiple VAE servers in one geographical area. In this case, a central VAE server may be considered for coordination between multiple VAE servers.

d. VAE server 01 may send the server discovery request to a subset of VAE servers or a central VAE server which is responsible for coordination between multiple VAE servers.

e. The described operations may apply to any V2X message (e.g., ETSI ITS, SAE).

f. The VAE server responsible for message distribution can be a message broker (e.g., MQTT or AMQP server). Corresponding publishing options and server discovery procedures may apply as well.

Server discovery of operation 503 of FIG. 5A is discussed in greater detail below with respect to FIG. 5B.

Figure 5B:
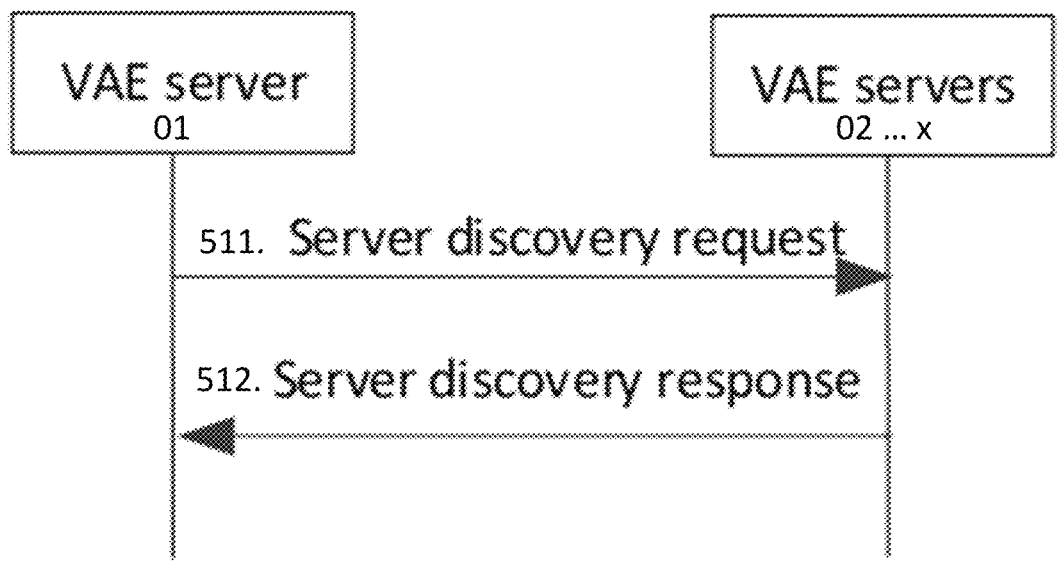
FIG. 5B illustrates VAE server discovery operations according to some embodiments of inventive concepts.

Operations to identify/determine an appropriate/best VAE server to serve a VAE client (V2X wireless device UE), upon initial VAE client registration or when moving to a new geographical area are illustrated in FIG. 5B. Such operations may use the VAE-E reference point for interaction (e.g., for transmission of messages) between VAE servers.

At operation 511 of FIG. 5B, the VAE server may transmit a Server discovery request (including information identifying the new geographical area 02 from message 501 of FIG. 5A) responsive to receiving the position update message of operation 501.

The table of FIG. 8 describes the information flow from a VAE server to issue a server discovery request to other VAE servers. For example, the server discovery request message may include a GEO ID which is a geographical area identifier (e.g., a subscription URI, tile identifier, geo fence tile identifier, etc.).

At operation 512 of FIG. 5B, another VAE server may respond to the server discover request message with a Server discovery response message. For example, the server discovery response message may include an identifier of the other VAE server (e.g., a FQDN) sending the server discover response message.

The table of FIG. 9 describes the information flow for a VAE server to respond to a server discovery request message from another VAE server. For example, the server discovery response message may include an identifier of the VAE server (that sends the server discovery response message), such as a Fully Qualified Domain Name FQDN. According to some embodiments of FIG. 5B:

The VAE server 01 may use the VAE-E interface to communicate and may be aware of the availability of other VAE servers 02 . . . x.

The VAE server 01 may receive a geographic location update (position update message), with a GEO ID, from a VAE client as described in subclause 8.2 of reference [3]. VAE server discovery of FIG. 5B are discussed below:

511. VAE server 01 sends a server discovery request message to other VAE servers 02 . . . x.

512. The VAE server 02 . . . x responsible for the new geographical area, corresponding to the GEO ID of the server discovery request message, responds by transmitting a server discovery response message to the VAE server 01.

Client-based approaches are discussed below with respect to FIGS. 6A and 6B.

According to some embodiments, a V2X wireless device UE (i.e. a VAE client) may be allowed to switch to another VAE server when moving to a new geographical area. For example, the client (V2X wireless device UE) may analyze if it can continue to receive current V2X service and/or messages from an original VAE server and decides if it should switch to another VAE server.

Initial connection establishment is discussed below with respect to FIG. 6A:

601) The VAE client (V2X wireless device UE) may acquire VAE server information from a configuration management server or may be pre-configured with respective addresses of VAE servers per geographical area.

602) The VAE client (V2X wireless device UE) may acquire V2X service and message information from VAE server 01. This may include information about available services per geographical area and corresponding VAE servers.

603) The VAE client (V2X wireless device UE) may subscribe to receive V2X messages from VAE server 01, which is responsible for delivering V2X service and messages of interest to the V2X wireless device UE in its initial/current geographic area.

NOTE that the VAE server 01 may initially provide the V2X service and message information, and the VAE server disseminating the V2X messages may be the same or different.

Figure 6A:
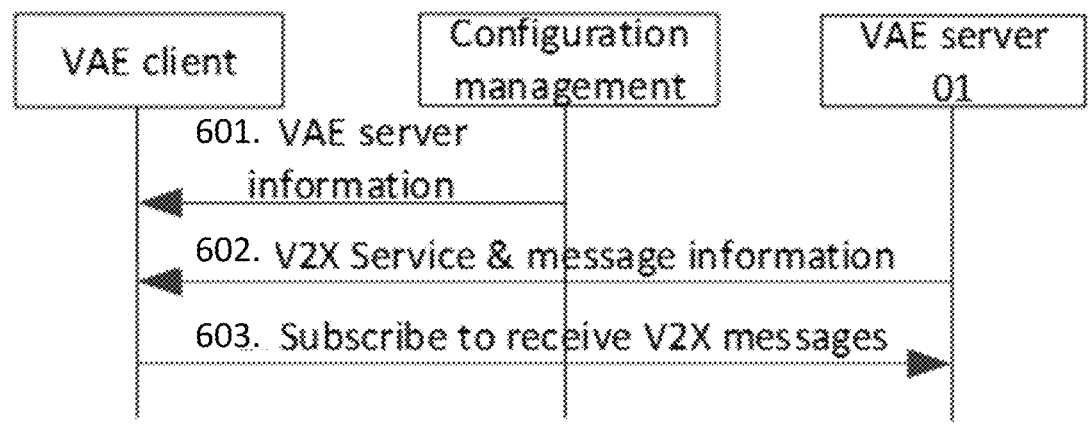
FIG. 6A illustrates V2X wireless device UE client operations for an initial V2X UE connection to a VAE server in geographical area 01 according to some embodiments of inventive concepts.

FIG. 6A illustrates operations for an initial V2X wireless device UE connection to VAE server 01 provided for geographical area 01.

Figure 6B:
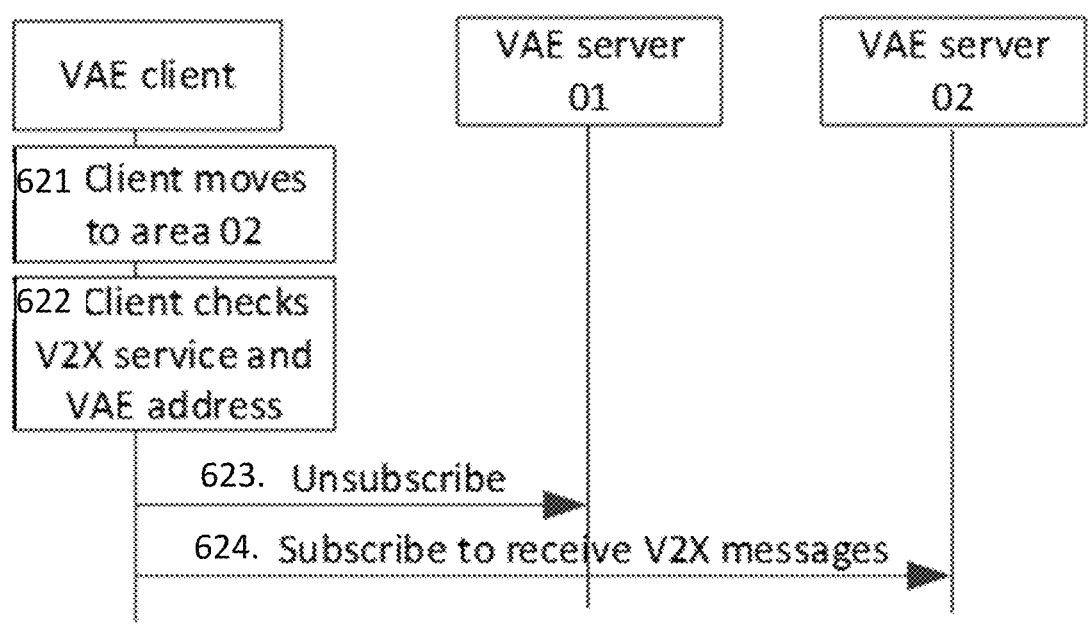
FIG. 6B illustrates V2X wireless device UE client operations when the V2X UE moves to geographical area 02 according to some embodiments of inventive concepts.

FIG. 6B illustrates operations/messages when the V2X wireless device UE Client moves to new geographical area 02:

621) V2X wireless device UE Client detects that it has moved to the new geographical area 02.

622) V2X wireless device UE Client checks V2X service information and VAE server information per geographical area 02 and decides if it should continue to receive messages from VAE server 01 or to switch to VAE server 02.

623) The V2X wireless device UE client unsubscribes from receiving V2X messages from VAE server 01.

624) The V2X wireless device UE client subscribes to receive V2X messages from VAE server 02.

Comparison between server-based and client-based approaches:
- VAE server-based approaches may provide higher granularity as information about V2X application-specific server publishing group information may not be completely available at the client.
- VAE server-based approaches may reduce/avoid unnecessary switches to a new VAE server when the service can be still delivered by the old VAE server.
- Client-based approaches may depend on client implementation. A client (V2X wireless device UE) may typically terminate connection with a server when the service cannot be received anymore (TCP timeout). A server-based approach may be more proactive.

In another implementation, more than one V2X AS and/or VAE can serve a certain geographical area. This, for example, may be appropriate to meet low latency requirements by placing servers closer to the radio cell (edge cloud) while ones further away serve less delay critical applications (e.g., vehicle signage is not really delay critical but emergency brake warning is). In this case, the V2X wireless devices UEs communicate with multiple servers applying previously described procedures for each of them.

According to some embodiments of inventive concepts, methods may be provided for server discovery which enable a VAE client (V2X wireless device UE) to connect to a (new) VAE server when initially starting the VAE client or when moving to a new geographical area (e.g., border crossing). Such methods may provide interactions between the VAE servers over the VAE-E interface, and/or may allow discovery of an appropriate VAE server to serve the VAE client (V2X wireless device UE) when moving to a new geographic area. According to some embodiments, application server discover procedures may be provided in ITS message distribution.

Operations of a VAE server 1200 (implemented using the structure of FIG. 12, for example, VAE server 01) will now be discussed with reference to the flow charts of FIGS. 13A-B according to some embodiments of inventive concepts. For example, modules may be stored in memory 1205 of FIG. 12, and these modules may provide instructions so that when the instructions of a module are executed by respective VAE server processing circuitry 1203, processing circuitry 1203 performs respective operations of the flow charts.

At block 1300, processing circuitry 1203 may receive V2X message information per geographical area from a V2X application specific server (as discussed above, for example, with respect to operation 500 of FIG. 5A).

According to some embodiments at block 1300, the VAE server (for example, VAE server 01) may receive information about available V2X messages for a geographical area from the V2X application-specific server. For example, the VAE server may obtain information of available V2X services (e.g., identified by Provider Service Identifier PSID of Intelligent Transport Systems Application Object Identifier ITS-AID) and their corresponding geographical area association from the V2X application.

At block 1301, processing circuitry 1203 may receive position information from a VAE client of a V2X wireless device (as discussed above, for example with respect to operation 501 of FIG. 5A), wherein the position information indicates a position of the V2X wireless device.

According to some embodiments at block 1301, the VAE server may receive the position information as a geographic location update, with a Geographic Area Identity GEO ID, from the VAE client. For example, the VAE server may receive a geographic location update for a geographic area outside its coverage, with GEO ID, from the VAE client.

Responsive to receiving the position information and responsive to the V2X message information per geographical area, processing circuitry 1203 may identify a second VAE server (for example, VAE server 02) based on the position information at block 1303 (as discussed above, for example, with respect to operation 503 of FIG. 5A).

At block 1304, processing circuitry 1203 may transmit an address for the second VAE server to the VAE client of the wireless device (as discussed above, for example, with respect to operation 504 of FIG. 5A).

According to some embodiments of inventive concepts, operations of block 1303 may be performed as shown in FIG. 13B. For example, processing circuitry 1203 may transmit a server discovery request through network interface 1207 to a plurality of other VAE servers (for example, VAE servers 02 . . . x) including the second VAE server at block 511 (as discussed above for example, with respect to operation 511 of FIG. 5B), wherein the server discovery request includes the position information. At block 1312, processing circuitry 1203 may receive a server discovery response (through network interface 1207) from the second VAE server (as discussed above, for example, with respect to operation 512 of FIG. 5B), wherein the server discovery response includes the address of the second VAE server.

According to some embodiments at block 1311, the server discover request may be referred to as a server relocation request or a service continuity request, and the server discover request may be sent over a VAE-E reference point. For example, the first VAE server (for example, VAE server 01) may send the service continuity request to all VAE servers it is connected to or to a subset of VAE servers, e.g., within the same PLMN. According to some embodiments at block 1312, the server discovery response may be referred to as a server relocation response or a service continuity response.

According to some embodiments of inventive concepts, the VAE capabilities may enable a V2X wireless device with a VAE client (also referred to as a V2X UE) to continue receiving V2X service from the same or different VAE server when changing geographical areas.

Various operations from the flow charts of FIGS. 13A-B may be optional with respect to some embodiments of VAE servers and related methods. Regarding methods of example embodiment 1 (set forth below), for example, operations of blocks 1311 and 1312 of FIGS. 13A-B may be optional.

Operations of a first VAE server 1200 (implemented using the structure of FIG. 12, for example, VAE server 02) will now be discussed with reference to the flow chart of FIG. 14 according to some embodiments of inventive concepts. For example, modules may be stored in memory 1205 of FIG. 12, and these modules may provide instructions so that when the instructions of a module are executed by respective VAE server processing circuitry 1203, processing circuitry 1203 performs respective operations of the flow chart.

At block 1411, processing circuitry 1203 may receive a server discovery request (through network interface 1207) from a second VAE server (for example, VAE server 01) at block 1411 (as discussed above, for example, with respect to operation 511 of FIG. 5B). Moreover, the server discovery request may include position information for a wireless device.

According to some embodiments at block 1411, the server discovery request may be referred to as a server relocation request or a service continuity request, and the server discover request may be received over a VAE-E reference point.

At block 1411*a*, processing circuitry 1203 may compare the position information with a service area for the first VAE server responsive to receiving the server discovery request.

At block 1412, processing circuitry 1203 may transmit a server discovery response to the second VAE server in response to the server discovery request (as discussed above, for example, with respect to operation 512 of FIG. 5B), wherein the server discovery response includes the address of the first VAE server. For example, the server discovery response may be transmitted responsive to the position information of blocks 1411 and 1411*a* matching a service area for the first VAE server.

According to some embodiments at block 1312, the server discovery response may be referred to as a server relocation response or a service continuity response.

Figure 14:
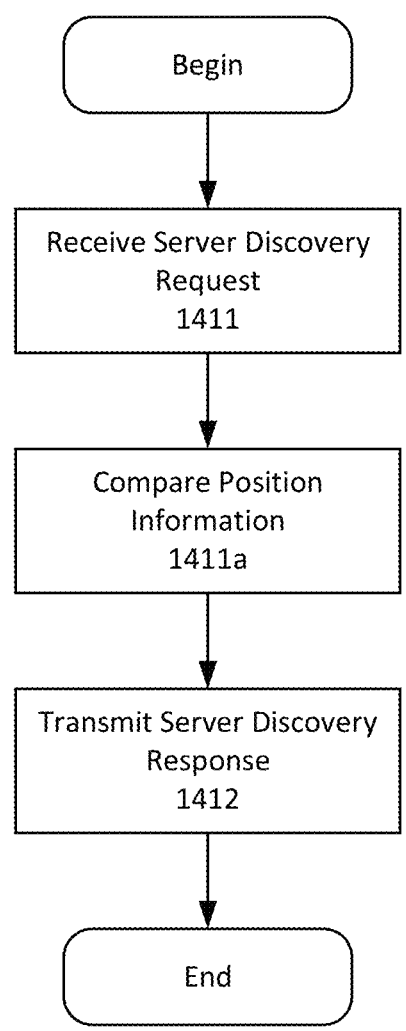
FIG. 14 is a flow chart illustrating operations of a VAE server (VAE Server 02) according to some embodiments of inventive concepts.

Various operations from the flow chart of FIG. 14 may be optional with respect to some embodiments of VAE servers and related methods. Regarding methods of example embodiment 13 (set forth below), for example, operations of block 1411*a* of FIG. 14 may be optional.

Operations of the wireless device 1000 (implemented using the structure of the block diagram of FIG. 10) will now be discussed with reference to the flow chart of FIG. 15 according to some embodiments of inventive concepts. For example, modules may be stored in memory 1005 of FIG. 10, and these modules may provide instructions so that when the instructions of a module are executed by respective wireless device processing circuitry 1003, processing circuitry 1003 performs respective operations of the flow chart.

At block 1501, processing circuitry 1003 may provide VAE server information for a plurality of VAE servers (as discussed above, for example, with respect to operations 601/602 of FIG. 6A). The VAE server information may include for each of the plurality of VAE servers a respective address, a respective geographic area associated with the VAE server, and/or respective service/message information regarding V2X services available from the VAE server.

At block 1503, processing circuitry 1003 may subscribe to receive V2X messages from a first VAE server (for example, VAE server 01) of the plurality of VAE servers (as discussed above, for example, with respect to operation 603 of FIG. 6A).

At block 1505, processing circuitry 1003 may determine whether the V2X wireless device UE has moved.

Responsive to detecting movement from a first geographic area associated with the first VAE server to a second geographic area at block 1505, processing circuitry may identify (622, 1507) a second VAE server (for example, VAE server 02) of the plurality of VAE servers associated with the second geographic area based on the VAE server information at block 1507 (as discussed above, for example, with respect to operations 621/622 of FIG. 6B).

Responsive to detecting movement and/or responsive to identifying the second VAE server, processing circuitry 1003 may unsubscribe from the first VAE server at block 1509 (as discussed above, for example, with respect to operation 623 of FIG. 6B).

Responsive to identifying the second VAE server, processing circuitry 1003 may subscribe to receive V2X messages from the second VAE server at block 1511 (as discussed above, for example, with respect to operation 624 of FIG. 6B).

Figure 15:
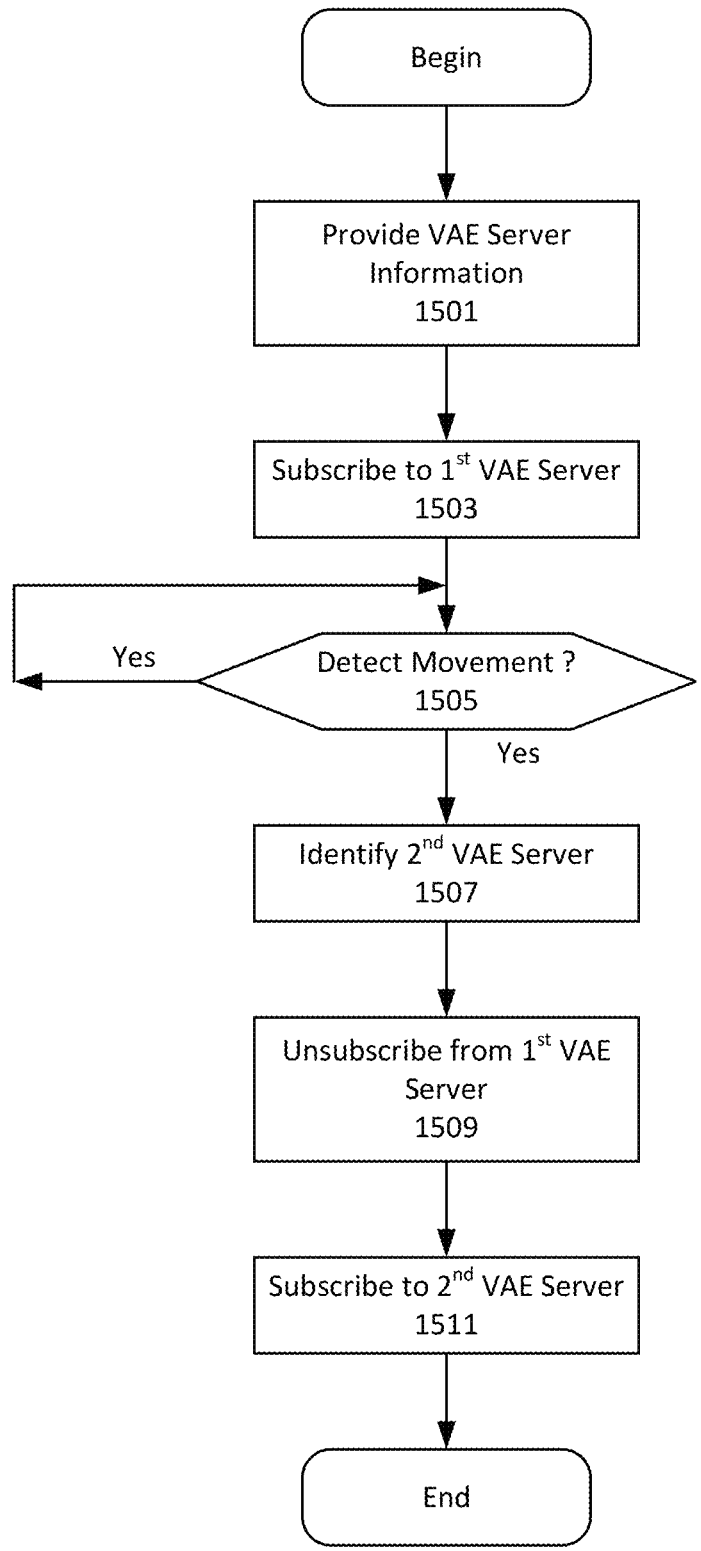
FIG. 15 is a flow chart illustrating operations of a V2X wireless device UE according to some embodiments of inventive concepts.

Various operations from the flow chart of FIG. 15 may be optional with respect to some embodiments of wireless devices and related methods. Regarding methods of example embodiment 20 (set forth below), for example, operations of block 1509 of FIG. 15 may be optional.

Procedures for VAE server relocation are discussed below.

TS 23.286 describes procedures for registering for receiving V2X messages and for subscribing to geographical location by the VAE client, and reasons for change are discussed below.

When a V2X UE registers for receiving V2X messages or upon moving to a new geographical area, the best VAE server to serve the V2X UE might change depending on several factors, such as location and V2X messages supported by the VAE server. As a result, a procedure to determine the best VAE server for the V2X UE is disclosed.

The current TS (Technical Specification) describes several deployment scenarios. In several distributed deployment scenarios, the VAE servers communicate over the VAE-E interface. The VAE-E interface is currently unspecified.

The VAE servers communicate to determine the best serving VAE server for a V2X UE depending on V2X UE location and VAE capabilities to continue serving a V2X UE when moving to a new geographical area. For instance, when different VAE servers are responsible for different geographical areas, the current VAE server might not be able to continue serving the V2X UE. In this situation, VAE server relocation may be useful.

Figure 25:
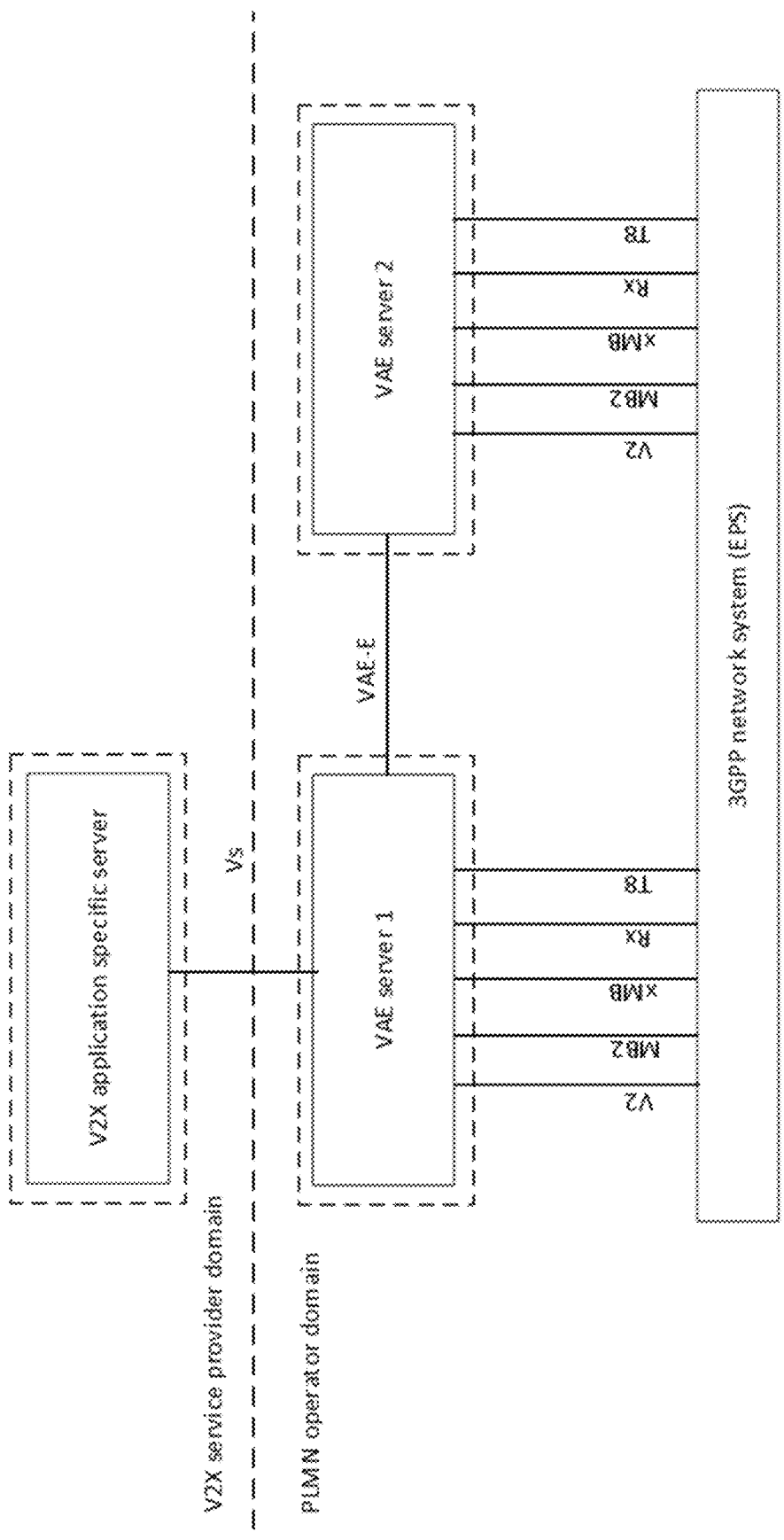
FIG. 25 is a block diagram illustrating elements of a V2X service provider domain and a PLMN operator domain in accordance with some embodiments.

FIG. 25 illustrates elements of the V2X service provider domain and the PLMN operator domain.

The following changes to 3GPP TS 23.286 v1.0 are proposed, where server relocation, including VAE server relocation, is discussed below according to some embodiments.

A procedure to determine the best VAE server to serve a VAE client when moving to a new geographical area is discussed. The procedure utilizes the VAE-E reference point for interaction between the VAE servers.

Figures 26, 27, 28:
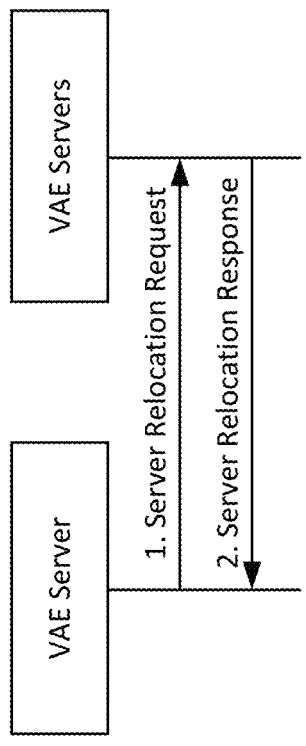
FIG. 26 is a table illustrating a server relocation request in accordance with some embodiments.
FIG. 27 is a table illustrating a server relocation response in accordance with some embodiments.
FIG. 28 is a message diagram illustrating procedures for VAE server relocation in accordance with some embodiments.

Information flows are discussed with respect to FIG. 26 (Server Relocation Request) and FIG. 27 (Server Relocation Response). The table of FIG. 26 illustrates the information flow from a VAE server to issue a server relocation request to other VAE servers. The table of FIG. 27 illustrates the information flow of a server relocation response for a VAE server to respond to a server relocation request from another VAE server.

Procedures for VAE server relocation are discussed below, including preconditions and VAE server relocation procedures. Preconditions may include:

The VAE server is using the VAE-E interface to communicate and is aware of the availability of other VAE servers.

The VAE server has received information about available V2X messages for a geographical area from the V2X application-specific server.

The VAE server has received a geographic location update, with GEO ID, from a VAE client.

Procedures for VAE server relocation are illustrated in FIG. 28. At operation/message 1 of FIG. 28, the VAE server sends a server relocation request to other VAE servers over VAE-E reference point. At operation/message 2 of FIG. 28, the VAE server responsible for the new geographical area, with GEO ID, provides a server relocation response to the VAE server over VAE-E reference point.

The VAE server receives information from a V2X application-specific server about available V2X services and that these services may be geographical area specific. The VAE server uses/needs such information to deliver V2X messages to the V2X UEs.

The V2X UEs are able to continue receiving the V2X service when changing geographical areas. That could be from the same or different VAE server. The VAE capabilities support service continuity.

Aspects for V2X application layer functional architecture are discussed below according to some embodiments. The VAE client and the VAE server may support one or more V2X applications. The VAE capabilities may be offered as APIs to the V2X applications. The VAE capabilities may enable V2X UEs to obtain the address of available V2X application servers associated with served geographical area information. The VAE capabilities may enable V2X UEs to obtain the information of available V2X services (e.g. identified by PSID or ITS-AIDs). The VAE server may obtain information of available V2X services (e.g. identified by PSID or ITS-AIDs) and their corresponding geographical area association from the V2X application.

Aspects of V2X (e.g. ETSI ITS, SAE) message distribution are discussed below according to some embodiments. The VAE server may provide a mechanism to distribute V2X messages to all registered receivers in targeted geographical areas. The VAE server may enable the delivery of several V2X messages over the same connection. The VAE client may have the capability to register to V2X messages within one or more geographical area. The VAE server may have the capability to only forward V2X messages to authorized V2X UEs in target geographical areas. The VAE server may provide a mechanism for priority support of different V2X messages (e.g., safety message). The VAE capabilities may enable V2X UEs to continue receiving V2X service from the same or different VAE server when changing geographical area.

Example embodiments are discussed below.

1. A method of operating a first vehicle-to-anything, V2X, application enabler, VAE, server (01), the method comprising: receiving (500, 1300) V2X message information per geographical area from a V2X application specific server; receiving (501, 1301) position information from a VAE client of a wireless device, wherein the position information indicates a position of the wireless device; responsive to receiving the position information and responsive to the V2X message information per geographical area, identifying (503, 1303) a second VAE server (02) based on the position information; and transmitting (504, 1304) an address for the second VAE server (02) to the VAE client of the wireless device.

2. The method of Embodiment 1, wherein identifying the second VAE server comprises, transmitting (511, 1311) a server discovery request to a plurality of other VAE servers (02 . . . x) including the second VAE server, wherein the server discovery request includes the position information, and receiving (512, 1312) a server discovery response from the second VAE server, wherein the server discovery response includes the address of the second VAE server.

3. The method of Embodiment 2, wherein transmitting the server discovery request comprises transmitting the server discovery request to the second VAE server over a VAE-E interface, and/or wherein receiving the server discovery response comprises receiving the server discovery response from the second VAE server over a VAE-E interface.

4. The method of any of Embodiments 1-3, wherein receiving the position information comprises receiving a position update message from the VAE client of the wireless device, wherein the position update message includes the position information.

5. The method of any of Embodiments 1-3, wherein receiving the position information comprises receiving an initial registration message from the VAE client of the wireless device, wherein the initial registration message includes the position information.

6. The method of any of Embodiments 1-5, wherein transmitting the address comprises transmitting a redirect message to the VAE client of the wireless device, wherein the redirect message includes the address for the second VAE server.

7. The method of any of Embodiments 1-6, wherein the position information comprises a geographic area identifier.

8. The method of Embodiment 7, wherein the geographic area identifier comprises at least one of a subscription uniform resource identifier, a tile identifier, and/or a geo-fence tile identifier.

9. The method of any of Embodiments 1-8, wherein the address of the second VAE server comprises a fully qualified domain name for the second VAE server.

10. The method of any of Embodiments 1-9, wherein the first VAE server is a message broker responsible for message distribution.

11. The method of any of Embodiments 1-10, wherein the V2X message information per geographical area is received by the VAE server from the V2X application server over a Vs interface.

12. The method of any of Embodiments 1-11, wherein identifying the second VAE server is based on the position information and based on publishing options of V2X messages per geographical area.

13. A method of operating a first vehicle-to-anything, V2X, application enabler, VAE, server (02), the method comprising: receiving (511, 1411) a server discovery request from a second VAE server (01), wherein the server discovery request includes position information for a wireless device; and transmitting (512, 1412) a server discovery response to the second VAE server in response to the server discovery request, wherein the server discovery response includes the address of the first VAE server.

14. The method of Embodiment 13 further comprising: comparing (1411a) the position information with a service area for the first VAE server (02) responsive to receiving the server discovery request; wherein transmitting the server discovery response comprises transmitting the server discovery response responsive to the position information matching a service area for the first VAE server (02).

15. The method of any of Embodiments 13-14, wherein receiving the server discovery request comprises receiving the server discovery request from the second VAE server over a VAE-E interface, and/or wherein transmitting the server discovery response comprises transmitting the server discovery response to the second VAE server over a VAE-E interface.

16. The method of any of Embodiments 13-15, wherein the position information comprises a geographic area identifier.

17. The method of Embodiment 16, wherein the geographic area identifier comprises at least one of a subscription uniform resource identifier, a tile identifier, and/or a geo-fence tile identifier.

18. The method of any of Embodiments 13-17, wherein the address of the first VAE server (02) comprises a fully qualified domain name for the first VAE server.

19. The method of any of Embodiments 13-18, wherein the second VAE server is a message broker responsible for message distribution.

20. A method of operating a vehicle-to-anything (V2X) wireless device, the method comprising: providing (601/602, 1501) VAE server information for a plurality of VAE servers, wherein the VAE server information includes for each of the plurality of VAE servers a respective address, a respective geographic area associated with the VAE server, and/or respective service/message information regarding V2X services available from the VAE server; subscribing (603, 1503) to receive V2X messages from a first VAE server (01) of the plurality of VAE servers; responsive to detecting movement from a first geographic area associated with the first VAE server to a second geographic area, identifying (622, 1507) a second VAE server (02) of the plurality of VAE servers associated with the second geographic area based on the VAE server information; and responsive to identifying the second VAE server, subscribing (624, 1511) to receive V2X messages from the second VAE server.

21. The method of Embodiment 20 further comprising: responsive to detecting movement and/or responsive to identifying the second VAE server, unsubscribing (623, 1509) from the first VAE server.

22. The method of any of Embodiments 20-21, wherein providing the VAE server information comprises acquiring a respective address for each of the plurality of VAE servers and/or a respective geographic area associated with each of the plurality of VAE servers from a configuration management server.

23. The method of any of Embodiments 20-21, wherein providing the VAE server information comprises pre-configuring a respective address for each of the plurality of VAE servers and/or a respective geographic area associated with each of the plurality of VAE servers.

24. The method of any of Embodiments 20-23, wherein providing the VAE server information comprises acquiring from one of the plurality of VAE servers respective service/message information regarding V2X services available from each of the plurality of VAE servers.

25. A VAE server (1200) configured to operate with a communication network, the VAE server comprising: processing circuitry (1203); and memory (1205) coupled with the processing circuitry, wherein the memory includes instructions that when executed by the processing circuitry causes the VAE server to perform operations according to any of Embodiments 1-19.

26. A VAE server (1200) configured to operate with a communication network, wherein the VAE server is adapted to perform according to any of Embodiments 1-19.

27. A computer program comprising program code to be executed by processing circuitry (1203) of a VAE server (1200) configured to operate with a communication network, whereby execution of the program code causes the VAE server (1200) to perform operations according to any of embodiments 1-19.

28. A computer program product comprising a non-transitory storage medium including program code to be executed by processing circuitry (1203) of a VAE server (1200) configured to operate in a communication network, whereby execution of the program code causes the VAE server (1200) to perform operations according to any of embodiments 1-19.

29. A V2X wireless device (1000) configured to operate in a communication network, the V2X wireless device comprising: processing circuitry (1003); and memory (1005) coupled with the processing circuitry, wherein the memory includes instructions that when executed by the processing circuitry causes the V2X wireless device to perform operations according to any of Embodiments 20-24.

30. A V2X wireless device (1000) configured to operate in a communication network, wherein the V2X wireless device is adapted to perform according to any of Embodiments 20-24.

31. A computer program comprising program code to be executed by processing circuitry (1003) of a V2X wireless device (1000) configured to operate in a communication network, whereby execution of the program code causes the V2X wireless device (1000) to perform operations according to any of embodiments 20-24.

32. A computer program product comprising a non-transitory storage medium including program code to be executed by processing circuitry (1003) of a V2X wireless device (1000) configured to operate in a communication network, whereby execution of the program code causes the V2X wireless device (1000) to perform operations according to any of embodiments 20-24.

Explanations are provided below for various abbreviations/acronyms used in the present disclosure.

| Abbreviation | Explanation |
| --- | --- |
| V2X | Vehicle to Anything |
| V2X AS | V2X application server |
| VAE | V2X Application Enabler |
| V2X UE | User equipment |
| ITS | Intelligent Transport Systems |
| FQDN | Full qualified domain name |
| MQTT | Message Queuing Telemetry Transport |
| AMQP | Advanced Message Queuing Protocol |
| DENM | Decentralized Environmental Notification Message |
| IVI | Infrastructure to Vehicle Information |
| CAM | Cooperative Awareness Message |
| SAE | Society of Automotive Engineers |
| ETSI | European Telecommunications Standards Institute |
| URI | Uniform Resource Identifier |

References are identified below.

Reference [1]: 3GPP TR 23.795 V 16.1.0 (2018 December), Study on application layer support for V2X services Reference [2]: 3GPP TS 23.285 V 16.0.0 (2019 March), Architecture enhancements for V2X services Reference [3]: 3GPP TS 23.286 V 1.0.0 (2019 March), Application layer support for V2X services; Functional architecture and information flows Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 16:
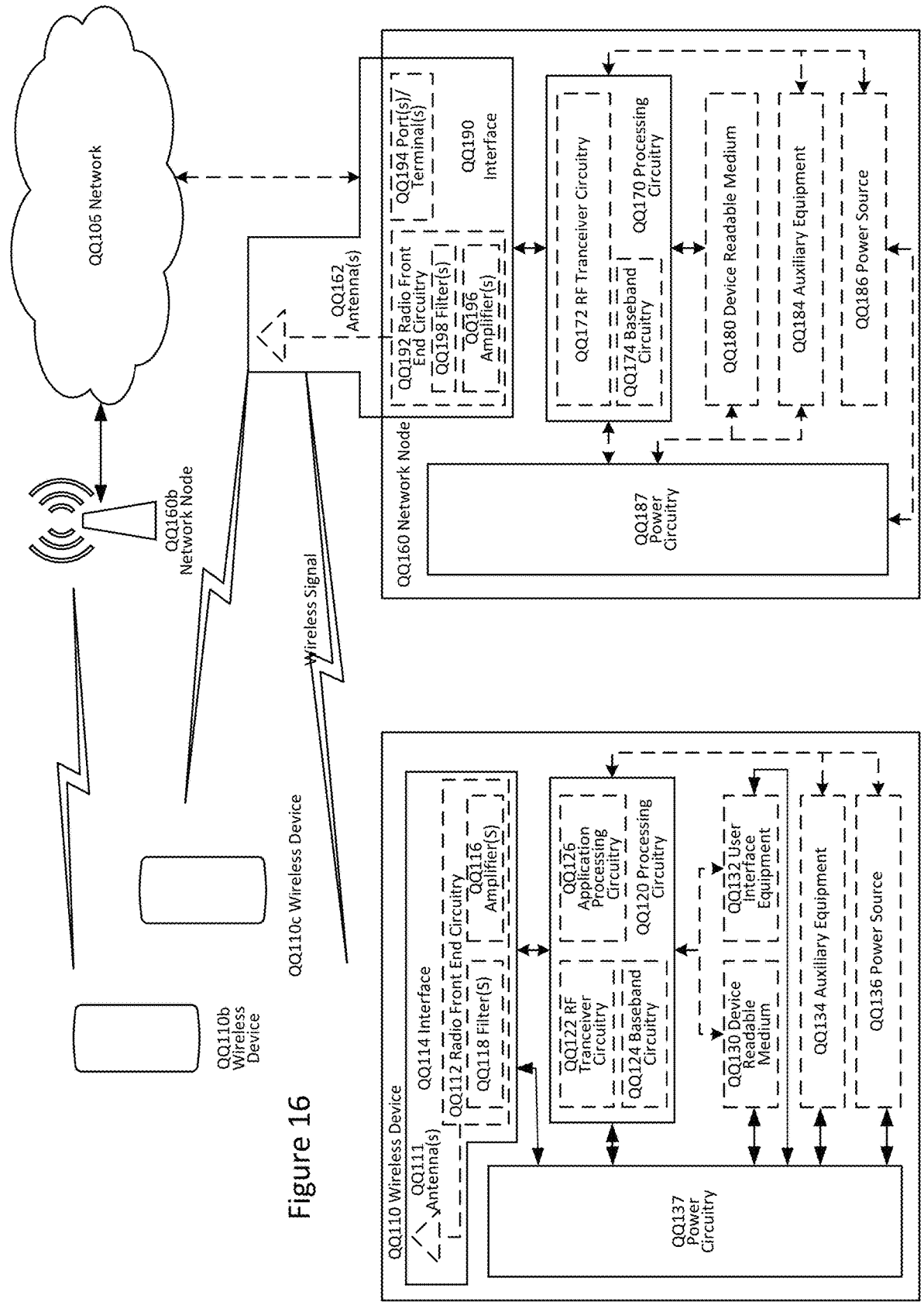
FIG. 16 is a block diagram of a wireless network in accordance with some embodiments.

FIG. 16 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 16 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 17:
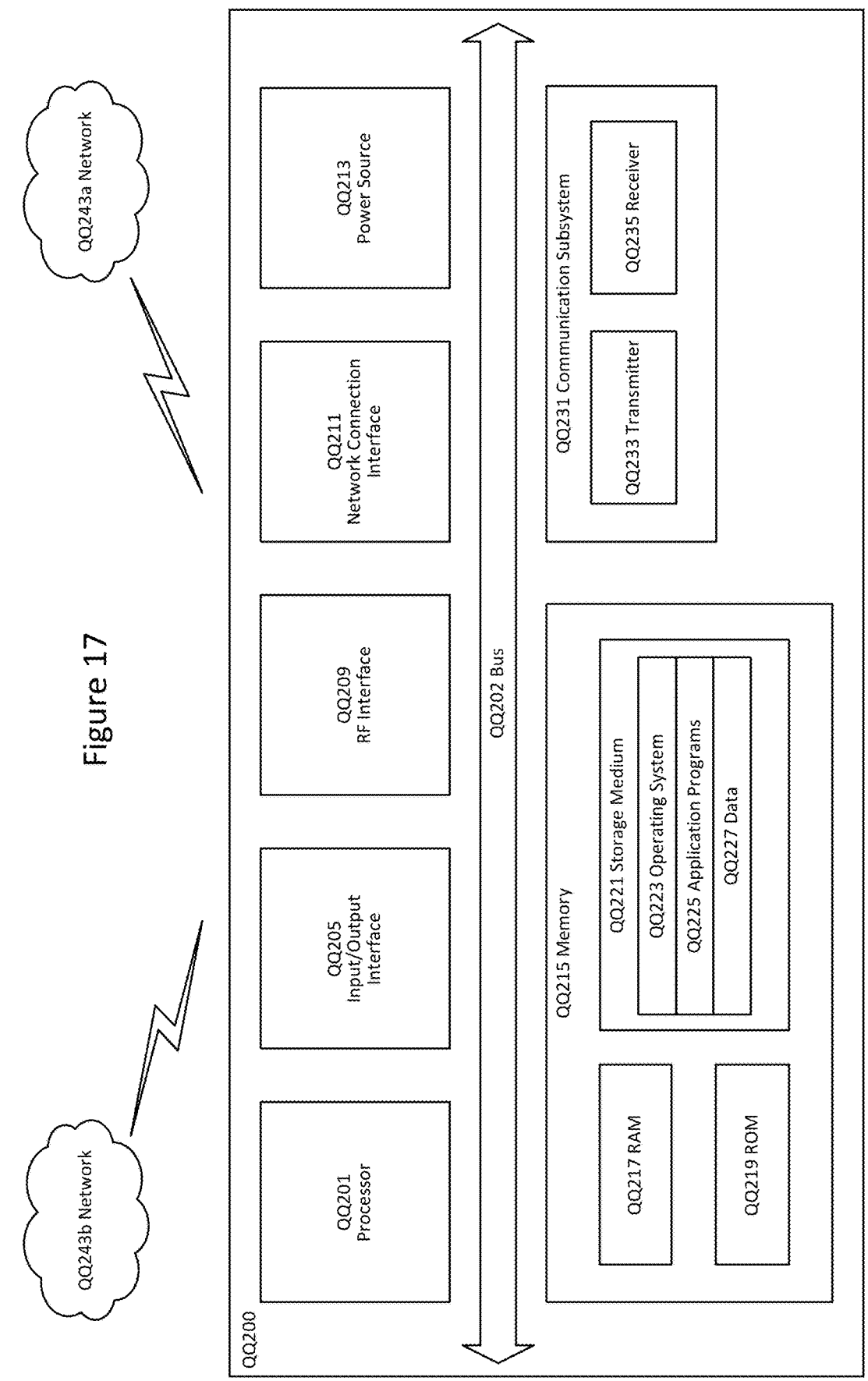
FIG. 17 is a block diagram of a user equipment in accordance with some embodiments

FIG. 17 illustrates a user Equipment in accordance with some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 17, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 17, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 18:
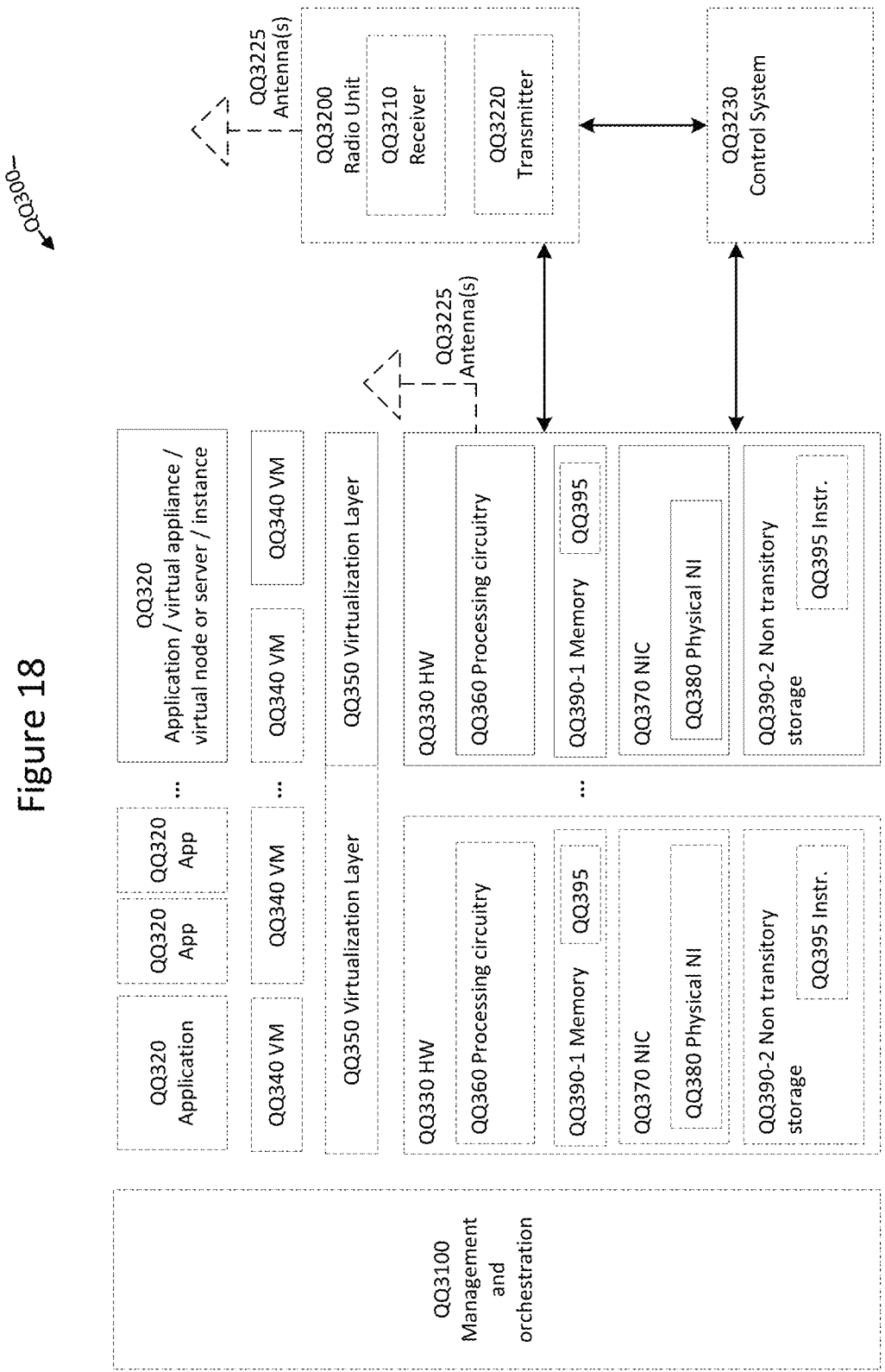
FIG. 18 is a block diagram of a virtualization environment in accordance with some embodiments.

FIG. 18 illustrates a virtualization environment in accordance with some embodiments.

FIG. 18 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 18, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 18.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 19:
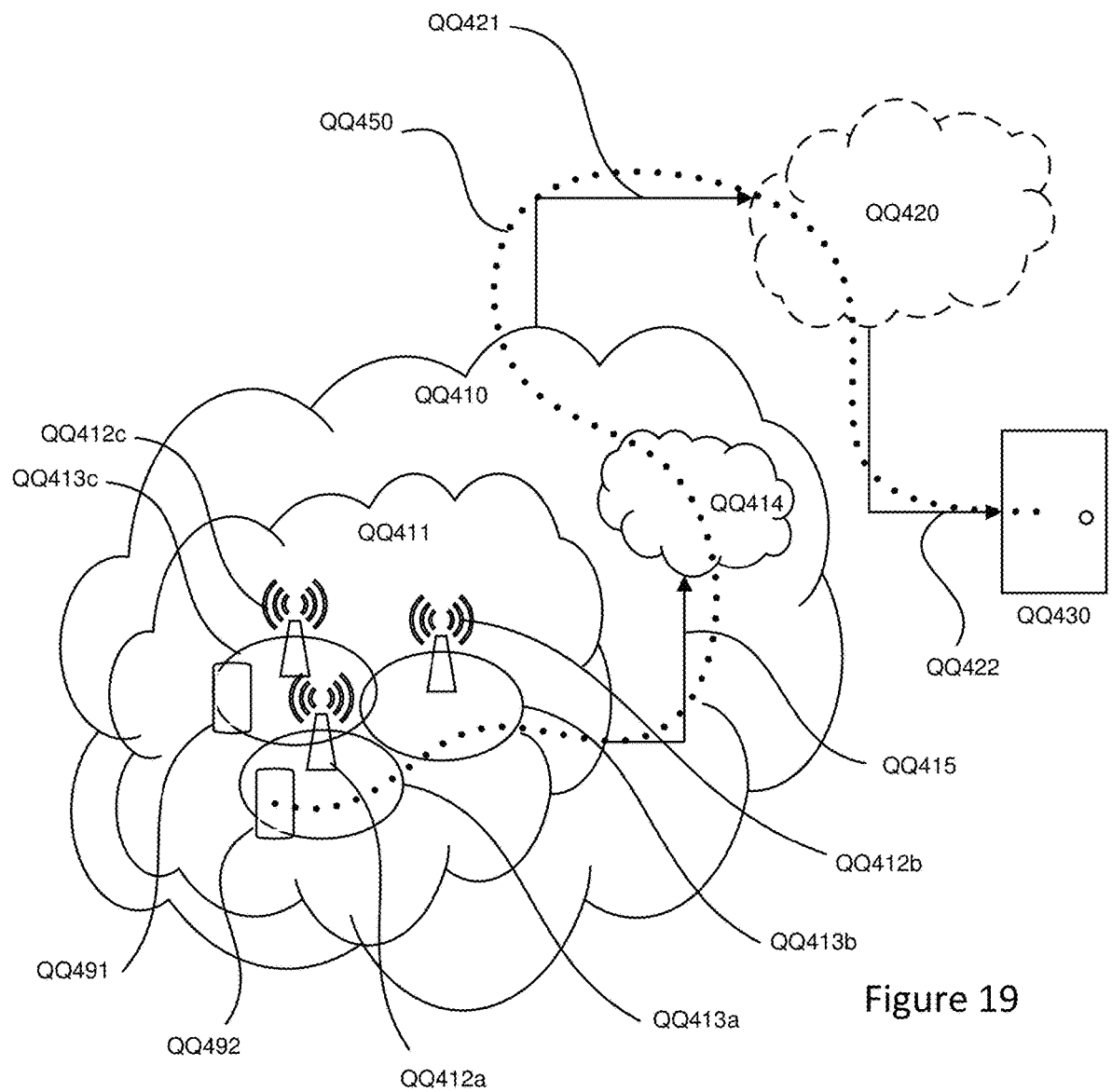
FIG. 19 is a block diagram of a telecommunication network connected via an intermediate network to a host computer in accordance with some embodiments.

FIG. 19 illustrates a telecommunication network connected via an intermediate network to a host computer in accordance with some embodiments.

With reference to FIG. 19, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 19 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 20:
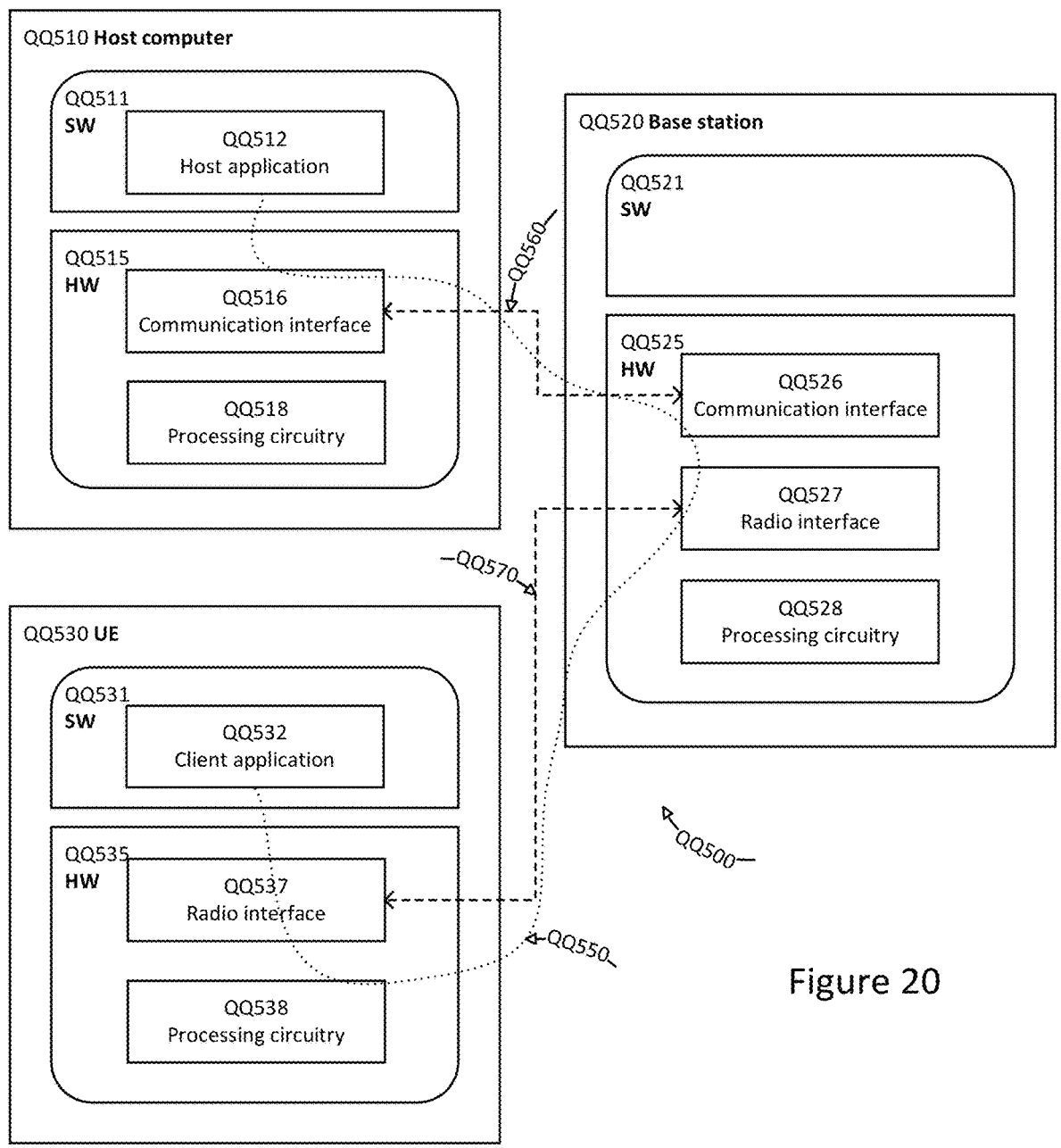
FIG. 20 is a block diagram of a host computer communicating via a base station with a user equipment over a partially wireless connection in accordance with some embodiments.

FIG. 20 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 20. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 20) served by base station QQ520. Communication interface QQ526 may be configured to facilitate connection QQ560 to host computer QQ510. Connection QQ560 may be direct or it may pass through a core network (not shown in FIG. 20) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 20 may be similar or identical to host computer QQ430, one of base stations QQ412a, QQ412b, QQ412c and one of UEs QQ491, QQ492 of FIG. 19, respectively. This is to say, the inner workings of these entities may be as shown in FIG. 20 and independently, the surrounding network topology may be that of FIG. 19.

In FIG. 20, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 21:
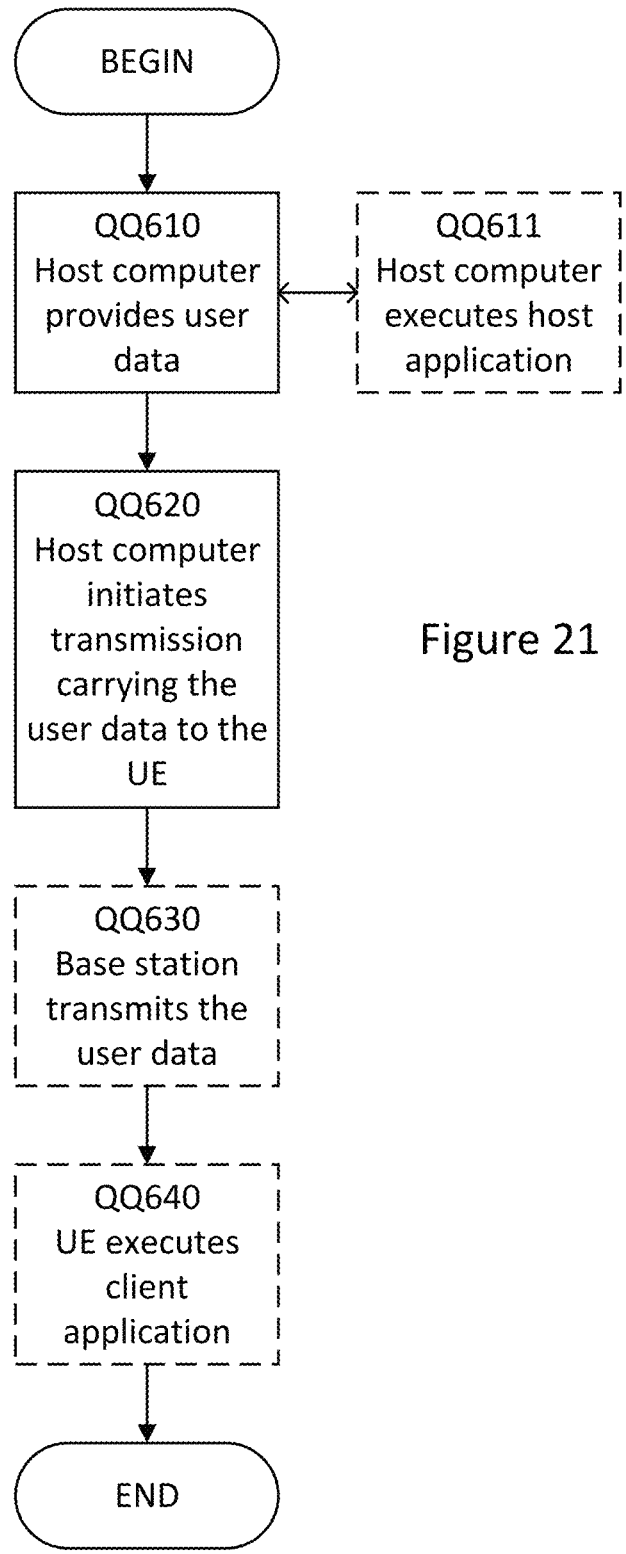
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 22:
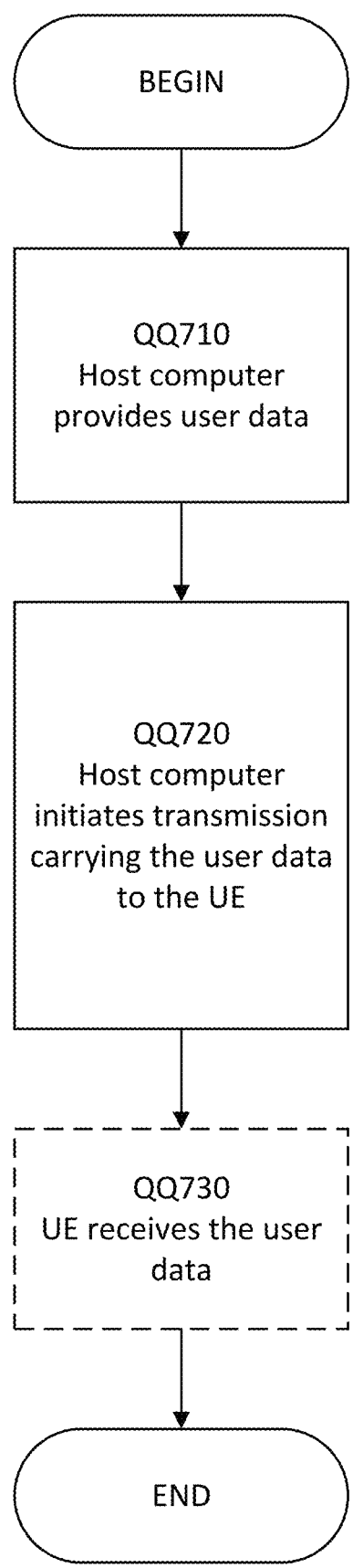
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step QQ710 of the method, the host computer provides user data. In an optional sub step (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 23:
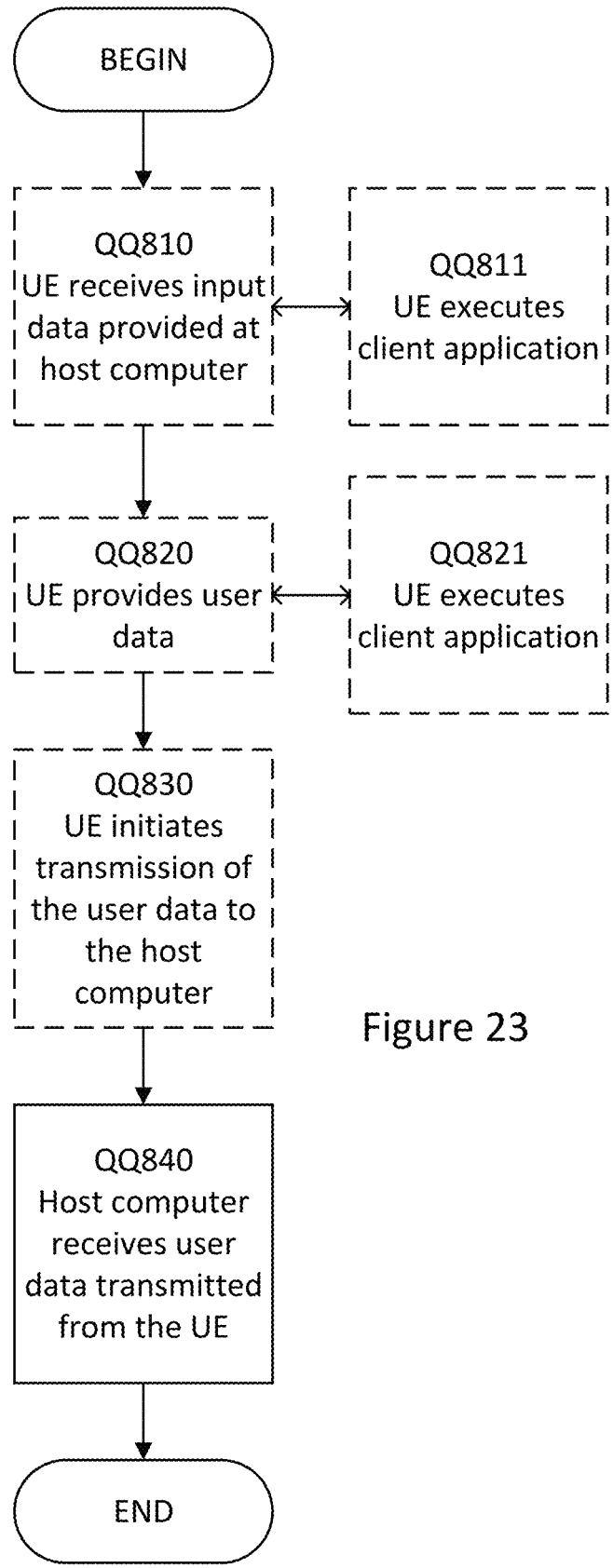
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 24:
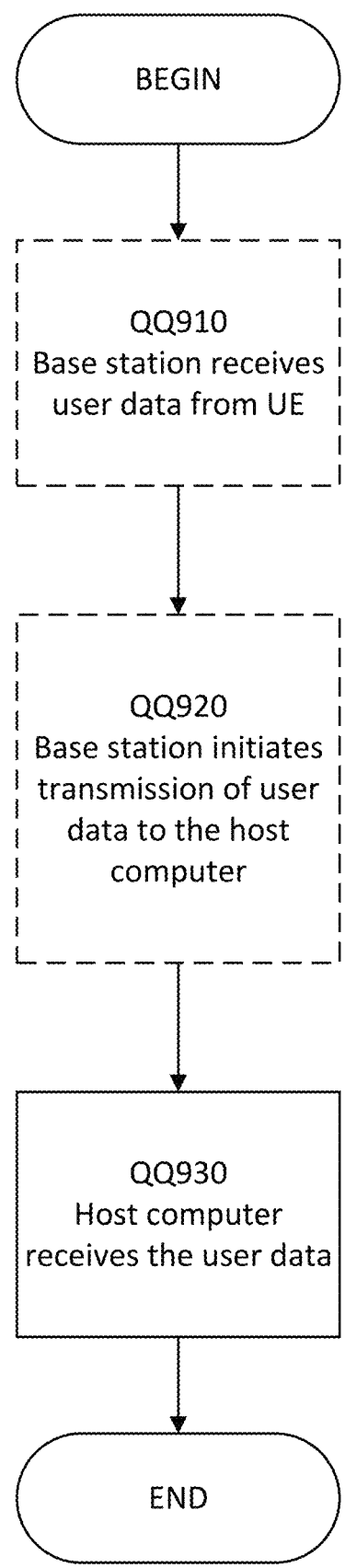
FIG. 24 is a block diagram of methods implemented in a communication system including a host computer, a base station and a user equipment in accordance with some embodiments.

FIG. 24 illustrates methods implemented in a communication system including a host computer, a base station and a user equipment in accordance with some embodiments FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MB SFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a first vehicle-to-anything (V2X) application enabler (VAE) server, the method comprising:
   receiving V2X message information per geographical area from a V2X application specific server;
   receiving position information from a VAE client of a wireless device, wherein the position information indicates a position of the wireless device; and
   responsive to receiving the position information and responsive to the V2X message information per geographical area, identifying a second VAE server based on the position information, wherein identifying the second VAE server includes transmitting a service continuity request to a plurality of other VAE servers including the second VAE server, wherein the service continuity request includes the position information, and receiving a service continuity response from the second VAE server, wherein the service continuity response includes an address of the second VAE server.

2. The method of claim 1, wherein receiving the position information comprises receiving a position update message from the VAE client of the wireless device, wherein the position update message includes the position information or receiving an initial registration message from the VAE client of the wireless device, wherein the initial registration message includes the position information.

3. The method of claim 1, wherein transmitting the address comprises transmitting a redirect message to the VAE client of the wireless device, wherein the redirect message includes the address for the second VAE server.

4. The method of claim 1, wherein the position information comprises a geographic area identifier, GEO ID.

5. The method of claim 1, wherein the address of the second VAE server comprises a fully qualified domain name for the second VAE server.

6. The method of claim 1, wherein the position information is received from the VAE client as a geographical location update with a Geographical Area Identifier (GEO ID).

7. A method of operating a first vehicle-to-anything (V2X) application enabler (VAE) server, the method comprising:
   receiving a service continuity request from a second VAE server, wherein the service continuity request includes position information for a wireless device;
   transmitting a service continuity response to the second VAE server in response to the service continuity request, wherein the service continuity response includes an address of the first VAE server; and
   comparing the position information with a service area for the first VAE server responsive to receiving the service continuity request;
   wherein transmitting the service continuity response comprises transmitting the service continuity response responsive to the position information matching a service area for the first VAE server.

8. The method of claim 7 further comprising:
   comparing the position information with a service area for the first VAE server responsive to receiving the service continuity request;
   wherein transmitting the service continuity response comprises transmitting the service continuity response responsive to the position information matching the service area for the first VAE server.

9. The method of claim 7, wherein the position information comprises a geographic area identifier.

10. The method of claim 7, wherein the address of the first VAE server comprises a fully qualified domain name for the first VAE server.

11. A first vehicle-to-anything (V2X) application enabler (VAE) server configured to operate with a communication network, the first VAE server comprising:
    processing circuitry; and
    memory coupled with the processing circuitry, wherein the memory includes instructions that when executed by the processing circuitry causes the first VAE server to,
    receive V2X message information per geographical area from a V2X application specific server,
    receive position information from a VAE client of a wireless device, wherein the position information indicates a position of the wireless device, and
    identify a second VAE server based on the position information responsive to receiving the position information and responsive to the V2X message information per geographical area, wherein identifying the second VAE server includes transmitting a service continuity request to a plurality of other VAE servers including the second VAE server, wherein the service continuity request includes the position information, and receiving a service continuity response from the second VAE server, wherein the service continuity response includes an address of the second VAE server,
    receiving a service continuity response from the second VAE server, wherein the service continuity response includes an address of the second VAE server.

12. The first VAE server of claim 11, wherein receiving the position information comprises receiving a position update message from the VAE client of the wireless device, wherein the position update message includes the position information or receiving an initial registration message from the VAE client of the wireless device, wherein the initial registration message includes the position information.

13. The first VAE server of claim 11, wherein transmitting the address comprises transmitting a redirect message to the VAE client of the wireless device, wherein the redirect message includes the address for the second VAE server.

14. The first VAE server of claim 11, wherein the position information comprises a geographic area identifier (GEO ID).

15. The first VAE server of claim 11, wherein the address of the second VAE server comprises a fully qualified domain name for the second VAE server.

16. The first VAE server of claim 11, wherein the position information is received from the VAE client as a geographical location update with a Geographical Area Identifier, (GEO ID).

17. A first vehicle-to-anything (V2X) application enabler (VAE) server configured to operate with a communication network, the first VAE server comprising:
   processing circuitry; and
   memory coupled with the processing circuitry, wherein the memory includes instructions that when executed by the processing circuitry causes the first VAE server to,
   receive a service continuity request from a second VAE server, wherein the service continuity request includes position information for a wireless device;
   transmit a service continuity response to the second VAE server in response to the service continuity request, wherein the service continuity response includes an address of the first VAE server; and
   compare the position information with a service area for the first VAE server responsive to receiving the service continuity request;
   wherein transmitting the service continuity response comprises transmitting the service continuity response responsive to the position information matching a service area for the first VAE server.

18. The first VAE server of claim 17, wherein the memory includes instructions that when executed by the processing circuitry causes the first VAE server to compare the position information with a service area for the first VAE server responsive to receiving the service continuity request,
   wherein transmitting the service continuity response comprises transmitting the service continuity response responsive to the position information matching the service area for the first VAE server.

19. The first VAE server of claim 17, wherein the position information comprises a geographic area identifier.

20. The first VAE server of claim 17, wherein the address of the first VAE server comprises a fully qualified domain name for the first VAE server.

21. A computer program product comprising a non-transitory computer readable storage medium including program code to be executed by processing circuitry of a first vehicle-to-anything (V2X) application enabler (VAE) server, whereby execution of the program code causes the first VAE server to perform operations:
   receiving V2X message information per geographical area from a V2X application specific server;
   receiving position information from a VAE client of a wireless device, wherein the position information indicates a position of the wireless device; and
   responsive to receiving the position information and responsive to the V2X message information per geographical area, identifying a second VAE server based on the position information, wherein identifying the second VAE server includes transmitting a service continuity request to a plurality of other VAE servers including the second VAE server, wherein the service continuity request includes the position information, and receiving a service continuity response from the second VAE server, wherein the service continuity response includes an address of the second VAE server.

22. A computer program product comprising a non-transitory computer readable storage medium including program code to be executed by processing circuitry of a first vehicle-to-anything (V2X) application enabler (VAE) server configured to operate in a communication network, whereby execution of the program code causes the first VAE server to perform operations:
   receiving a service continuity request from a second VAE server, wherein the service continuity request includes position information for a wireless device;
   transmitting a service continuity response to the second VAE server in response to the service continuity request, wherein the service continuity response includes an address of the first VAE server; and
   comparing the position information with a service area for the first VAE server responsive to receiving the service continuity request; wherein transmitting the service continuity response comprises transmitting the service continuity response responsive to the position information matching a service area for the first VAE server.

* * * * *